(12) United States Patent
Aahlad et al.

(10) Patent No.: US 9,900,381 B2
(45) Date of Patent: *Feb. 20, 2018

(54) METHODS, DEVICES AND SYSTEMS FOR INITIATING, FORMING AND JOINING MEMBERSHIPS IN DISTRIBUTED COMPUTING SYSTEMS

(71) Applicant: WANdisco, Inc., San Ramon, CA (US)

(72) Inventors: Yeturu Aahlad, Foster City, CA (US); Michael Parkin, San Ramon, CA (US); Naeem Akhtar, Dublin, CA (US)

(73) Assignee: WANdisco, Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/071,447

(22) Filed: Mar. 16, 2016

(65) Prior Publication Data
US 2017/0026465 A1    Jan. 26, 2017

Related U.S. Application Data

(63) Continuation of application No. 13/837,366, filed on Mar. 15, 2013, now Pat. No. 9,332,069.

(Continued)

(51) Int. Cl.
*H04L 29/08* (2006.01)
*H04L 12/18* (2006.01)

(52) U.S. Cl.
CPC ........ *H04L 67/1044* (2013.01); *H04L 12/185* (2013.01); *H04L 67/10* (2013.01); *H04L 67/1046* (2013.01); *H04L 67/1048* (2013.01)

(58) Field of Classification Search
CPC . H04L 67/10; H04L 41/0813; H04L 41/0823; H04L 41/0869; H04L 41/12;
(Continued)

(56) References Cited

U.S. PATENT DOCUMENTS

| | | |
|---|---|---|
| 5,261,085 A | 11/1993 | Lamport |
| 5,699,515 A | 12/1997 | Berkema et al. |
| 5,737,601 A | 4/1998 | Jain et al. |
| 5,781,910 A | 7/1998 | Gostanian et al. |
| 5,963,086 A | 10/1999 | Hall |
| 6,014,669 A | 1/2000 | Slaughter et al. |

(Continued)

FOREIGN PATENT DOCUMENTS

| | | |
|---|---|---|
| CN | 102999633 A | 3/2013 |
| CN | 103458044 A | 12/2013 |

(Continued)

OTHER PUBLICATIONS

USPTO Notice of Allowance dated Mar. 8, 2016 in parent U.S. Appl. No. 13/637,366.
USPTO Office Action dated Feb. 3, 2016 in U.S. Appl. No. 14/231,311.
USPTO Office Action dated Dec. 19, 2014 in related U.S. Appl. No. 13/837,366.
International Preliminary Report on Patentability dated Jul. 9, 2015 in PCT application PCT/US2013/063422.

(Continued)

*Primary Examiner* — Sargon Nano
(74) *Attorney, Agent, or Firm* — Young Law Firm, PC

(57) ABSTRACT

A computer-implemented method of deploying a membership of nodes in a distributed computing system may comprise selecting nodes to be part of a membership of nodes; creating a membership task identifying a membership creator node as the node that is creating the membership and comprising a membership target identifying at least one node of the distributed computing system that is to become a member of the membership; and creating a beacon configured to send a create membership message to each identified node, the create membership message comprising at least an identity of the membership task and an identification of the membership. Upon receiving a response from a node in the membership target, the node from which the response was received may be removed from the beacon. The membership may be deployed when a response has been received from each of the nodes identified in the membership target.

19 Claims, 9 Drawing Sheets

Related U.S. Application Data

(60) Provisional application No. 61/746,940, filed on Dec. 28, 2012.

(58) Field of Classification Search
CPC ....... H04L 41/50; H04L 41/509; H04L 43/04; H04L 43/08; H04L 43/10; H04L 47/70; H04L 61/10; H04L 61/2507; H04L 65/403; H04L 65/06
See application file for complete search history.

(56) References Cited

U.S. PATENT DOCUMENTS

| | | | |
|---|---|---|---|
| 6,161,146 | A | 12/2000 | Kley et al. |
| 6,202,067 | B1 | 3/2001 | Blood et al. |
| 6,247,059 | B1 | 6/2001 | Johnson |
| 6,261,085 | B1 | 7/2001 | Steger et al. |
| 6,360,366 | B1 | 3/2002 | Heath et al. |
| 6,401,120 | B1 | 6/2002 | Gamache et al. |
| 6,763,013 | B2 | 7/2004 | Kennedy |
| 6,763,014 | B2 | 7/2004 | Kennedy |
| 6,885,644 | B1 | 4/2005 | Knop et al. |
| 6,898,642 | B2 | 5/2005 | Chafle et al. |
| 6,973,053 | B1 | 12/2005 | Passman |
| 7,069,320 | B1 | 6/2006 | Chang |
| 7,155,524 | B1 | 12/2006 | Reiter et al. |
| 7,167,900 | B2 | 1/2007 | Berkowitz et al. |
| 7,185,076 | B1 | 2/2007 | Novaes |
| 7,187,226 | B2 | 3/2007 | Audy |
| 7,272,129 | B2 | 9/2007 | Calcev |
| 7,280,040 | B2 | 10/2007 | DeVaul |
| 7,334,154 | B2 | 2/2008 | Lorch et al. |
| 7,400,596 | B1 | 6/2008 | Robertson et al. |
| 7,558,883 | B1 | 7/2009 | Lamport |
| 7,729,336 | B2 | 6/2010 | Pun |
| 7,765,186 | B1 | 7/2010 | Hu et al. |
| 7,788,522 | B1 | 8/2010 | Abdelaziz |
| 7,849,223 | B2 | 12/2010 | Malkhi |
| 8,180,747 | B2 | 5/2012 | Marinkovic |
| 8,194,422 | B2 | 6/2012 | Djenguerian |
| 8,458,239 | B2 | 6/2013 | Ananthanarayanan et al. |
| 8,489,549 | B2 | 7/2013 | Guarraci |
| 8,537,721 | B2 | 9/2013 | Patel |
| 8,693,453 | B2 | 4/2014 | Priyantha |
| 8,818,951 | B1 | 8/2014 | Muntz |
| 9,009,215 | B2 | 4/2015 | Aahlad et al. |
| 9,130,943 | B1 | 9/2015 | Giardina |
| 2002/0129087 | A1 | 9/2002 | Cachin et al. |
| 2002/0184169 | A1 | 12/2002 | Opitz |
| 2003/0131262 | A1* | 7/2003 | Goddard ............. H04L 63/0218 726/11 |
| 2003/0145020 | A1 | 7/2003 | Ngo et al. |
| 2003/0154284 | A1* | 8/2003 | Bernardin ............... G06F 9/465 709/226 |
| 2004/0015968 | A1* | 1/2004 | Neiman ................ G06F 9/4843 718/100 |
| 2004/0034822 | A1* | 2/2004 | Marchand ........... H04L 12/1863 714/712 |
| 2004/0042417 | A1 | 3/2004 | Kennedy |
| 2004/0111441 | A1 | 6/2004 | Saito |
| 2004/0172421 | A1 | 9/2004 | Saito et al. |
| 2004/0221149 | A1 | 11/2004 | Rao |
| 2005/0086384 | A1 | 4/2005 | Ernst |
| 2005/0198493 | A1 | 9/2005 | Bartas |
| 2005/0283644 | A1 | 12/2005 | Lorch et al. |
| 2006/0013252 | A1* | 1/2006 | Smith ..................... H04L 43/50 370/466 |
| 2006/0045055 | A1 | 3/2006 | Ramadas |
| 2006/0143517 | A1 | 7/2006 | Douceur et al. |
| 2006/0155729 | A1 | 7/2006 | Aahlad et al. |
| 2006/0203837 | A1 | 9/2006 | Shvodian |
| 2006/0235889 | A1 | 10/2006 | Rousseau et al. |
| 2006/0253856 | A1* | 11/2006 | Hu ........................ G06F 9/526 718/104 |
| 2006/0259818 | A1 | 11/2006 | Howell et al. |
| 2006/0265508 | A1 | 11/2006 | Angel |
| 2007/0168412 | A1 | 7/2007 | DeVaul |
| 2007/0189249 | A1 | 8/2007 | Gurevich |
| 2007/0204078 | A1 | 8/2007 | Boccon-Gibod |
| 2007/0226160 | A1 | 9/2007 | Acharya |
| 2008/0133741 | A1 | 6/2008 | Kubota |
| 2008/0134052 | A1 | 6/2008 | Davis et al. |
| 2009/0150566 | A1 | 6/2009 | Malkhi et al. |
| 2010/0118842 | A1 | 5/2010 | Kalhan |
| 2010/0153282 | A1 | 6/2010 | Graham |
| 2010/0180146 | A1 | 7/2010 | Rousseau et al. |
| 2010/0188969 | A1 | 7/2010 | Kim et al. |
| 2010/0192160 | A1 | 7/2010 | Taylor et al. |
| 2010/0333166 | A1 | 12/2010 | Herrod |
| 2011/0066296 | A1 | 3/2011 | Nelson |
| 2011/0072062 | A1 | 3/2011 | Guarraci |
| 2011/0107358 | A1 | 5/2011 | Shyam et al. |
| 2011/0302449 | A1 | 12/2011 | Douceur |
| 2011/0314163 | A1 | 12/2011 | Borins |
| 2012/0101991 | A1 | 4/2012 | Srivas et al. |
| 2012/0130950 | A1 | 5/2012 | Jain et al. |
| 2012/0197958 | A1 | 8/2012 | Nightingale |
| 2012/0254412 | A1 | 10/2012 | Goose et al. |
| 2012/0311003 | A1 | 12/2012 | Kuznetsov |
| 2013/0198332 | A1 | 8/2013 | Van Ackere |
| 2013/0219385 | A1* | 8/2013 | Geibel ................ G06F 9/45558 718/1 |
| 2014/0019495 | A1 | 1/2014 | Borthakur |
| 2014/0059310 | A1 | 2/2014 | Du et al. |
| 2014/0074996 | A1 | 3/2014 | Bortnikov et al. |
| 2014/0081927 | A1 | 3/2014 | Lipcon |
| 2014/0082145 | A1 | 3/2014 | Lacapra |
| 2014/0164262 | A1 | 6/2014 | Graham |
| 2014/0195558 | A1 | 7/2014 | Murthy et al. |
| 2014/0330787 | A1 | 11/2014 | Modukuri et al. |
| 2014/0344323 | A1 | 11/2014 | Pelavin |
| 2014/0358844 | A1 | 12/2014 | Maudlapudi |
| 2015/0120791 | A1 | 4/2015 | Gummaraju |
| 2015/0234845 | A1 | 8/2015 | Moore |

FOREIGN PATENT DOCUMENTS

| | | |
|---|---|---|
| CN | 103458044 A1 | 12/2013 |
| JP | 2002033752 A | 1/2002 |

OTHER PUBLICATIONS

International Preliminary Report on Patentability dated Jul. 9, 2015 in PCT application PCT/US2013/063454.
International Search Report, and Written Opinion dated Jun. 25, 2015 in PCT application PCT/US2015/18680.
Office Action dated Jun. 24, 2015 in U.S. Appl. No. 13/837,366.
Office Action dated Jun. 25, 2015 in U.S. Appl. No. 12/069,986.
USPTO Notice of Allowance dated Jul. 30, 2015 in U.S. Appl. No. 14/464,030.
USPTO Office Action dated Sep. 24, 2015 in U.S. Appl. No. 14/013,948.
USPTO Office Action dated Sep. 24, 2015 in U.S. Appl. No. 14/041,894.
USPTO Office Action in U.S. Appl. No. 14/013,948 dated May 22, 2015.
USPTO Office Action in U.S. Appl. No. 14/041,894, dated Jun. 3, 2015.
Notice of Allowance dated Jan. 29, 2015 in related U.S. Appl. No. 13/838,639.
Implementing Fault-Tolerant Services Using the State Machine Approach: A Tutorial, Fred B. Schneider Department of Computer Science, Cornell University, Ithaca, New York 14853, ACM Computing Surveys, vol. 22, No. 4, Dec. 1990.
Specifying Systems, The TLA+ Language and Tools for Hardware and Software Engineers Leslie Lamport, Microsoft Research, First Printing, Version of Jun. 18, 2002, ISBN 0-321-14306-X.
The Part-Time Parliament, Leslie Lamport, ACM Transactions on Computer Systems 16, May 2, 1998, 133-169.
Time, Clocks, and the Ordering of Events in a Distributed System, Leslie Lamport, Massachusetts Computer Associates, Inc., Communications of the ACM, Jul. 1978, vol. 21, No. 7.

(56) References Cited

OTHER PUBLICATIONS

Paxos Made Simple, Leslie Lamport, Nov. 1, 2001.
Oki et al. "Viewstamped Replication: A new Primary Copy Method to Support Highly-Available Distributed Systems", Technical Paper submitted at ACM Sympoisium . . . , 1998, pp. 8-17.
Bernstein et al., "Concurrency Control & Recovery in Database Systems", published by Addison Wesley, 1987, Chapters 6, 7 and 8.
Eli Collins, Todd Lipcon, Aaron T Myers, HDFS High Availability.
Sanjay Radia, Rob Chansler, Suresh Srinivas, High Availability Framework for the HDFS Namenode.
Sanjay Radia, Suresh Srinivas, Yahoo! Inc. High Availability for the HDFS Namenode.
Todd Lipcon, Quorum-Journal Design, Oct. 3, 2012.
International Search Report and Written Opinion in PCT/US14/10451, dated Aug. 5, 2014.
Extended European Search Report dated Jul. 14, 2016 in EP application 138694.4.
Extended European Search Report dated Jul. 7, 2016 in EP application 138676.1.
Examination Report No. 1 for standard patent application dated Dec. 6, 2016 in AU patent application 2013368487.
Examination Report No. 1 for standard patent application dated Dec. 6, 2016 in AU patent application 2013368486.
Wiki Amazon S3 downloaded from http://en.wikipedia.org/wiki/Amazon_S3 on Mar. 4, 2014.
Introducing Geo-replication for Windows Azure Storage, Sep. 15, 2011 1:27 PM, downloaded from http://blogs.msdn.com/b/windowsazurestorage/archive/2011/09/15/introducing-geo-replication-for-windows-azure-storage.aspx on Mar. 4, 2014.
Google Cloud Storage Overview, downloaded from http://developers.google.com/storage/docs/overview on Mar. 4, 2014.
Cloudera Backup and Disaster Recovery, downloaded from https://www.cloudera.com/content/cloudera-content/cloudera-docs/CM4Ent/latest/Cloudera-Backup-Disaster-Recovery/Cloudera-Backup-Data-Recovery.html on Mar. 4, 2014.
What is Hadoop?>>Apache Falcon Apache Falcon a framework for managing data processing in Hadoop Clusters, downloaded from http://hortonworks.com/hadoop/falcon/ on Mar. 4, 2014.
MapR Disaster Recovery Scenario Data+Protection, Peter Conrad, last edited by Anne Leeper on Feb. 22, 2014, downloaded from http://doc.mapr.com/display/MapR/Data+Protection#DataProtection-Disaster-RecoveryScenario:DisasterRecovery on Mar. 4, 2014.
Hadoop HDFS HDFS-5442 Zero loss HDFS data replication for multiple datacenters, The Apache Software Foundation , Created: Oct. 29, 2013 13:11 Updated:Jan. 10, 2014 08:13, doownloaded from https://issues.apache.org/jira/browse/HDFS-5442 on Mar. 4, 2014.
Disaster Recovery Solution for Apache Hadoop Contributors: Chen Haifeng (haifeng.chen@intel.com), Gangumalla Uma (uma.gangumalla@intel.com), Dey Avik (avik.dey@intel.com), Li Tianyou (tianyou.ii@intel.com), Purtell, Andrew (andrew.k.purtell©intel.com), downloaded from https://issues.apache.org/jira/secure/attachment/12620116/Disaster%20Recovery%20Solution%20for%20Hadoop.pdf on Mar. 4, 2014.
Spanner: Google's Globally-Distributed Database, James C. Corbett, Jeffrey Dean, Michael Epstein, Andrew Fikes, Christopher Frost, JJ Furman, Sanjay Ghemawat, Andrey Gubarev, Christopher Heiser, Peter Hochschiid, Wilson Hsieh, Sebastian Kanthak, Eugene Kogan, Hongyi Li, Alexander Lloyd, Sergey Melnik, David Mwaura, David Nagle, Sean Quinlan, Rajesh Rao, Lindsay Rolig, Yasushi Saito, Michal Szymaniak, Christopher Taylor, Ruth Wang, and Dale Woodford, downloaded from http://research.google.com/archive/spanner.html on Mar. 4, 2014.
Transactional storage for geo-replicated systems Yair Sovran, Russell Power, Marcos K. Aguilera, Jinyang Li, downloaded from http://research.microsoft.com/en-us/people/aguilera/walter-sosp2011.pdf on Mar. 4, 2014.
Stronger Semantics for Low-Latency Geo-Replicated Storage, Wyatt Lloyd, Michael J. Freedman, Michael Kaminsky, and David G. Andersen, To appear in Proceedings of the 10th USENIX Symposium on Networked Systems Design and Implementation (NSDI'13), Lombard, IL, Apr. 2013, downlaoded from http://sns.cs.princeton.edu/docs/eiger-nsdi13.pdf on Mar. 4, 2014.
CSPAN: Cost-Effective Geo-Replicated Storage Spanning Multiple Cloud Services, Zhe Wu, Michael Butkiewicz, Dorian Perkins, Ethans Katz-Bassett, Harsha V. Madhyastha, downlaoded from http://conferences.sigcomm.org/sigcomm/2013/papers/sigcomm/p545.pdf on Mar. 4, 2014.
Geo-replication, downloaded from http://searchwindowsserver.techtarget.com/definition/geo-replication on Mar. 4, 2014.
Amazon Simple Storage Service Developer Guide API Version Mar. 1, 2006, downloaded from http://awsdocs.s3.amazonaws.com/S3/latest/s3-dg.pdf on Mar. 4, 2014.
USPTO Office Action dated Jul. 27, 2016 in U.S. Appl. No. 14/231,311.
USPTO Office Action dated Feb. 10, 2017 in U.S. Appl. No. 14/815,787.
USPTO Office Action dated Mar. 9, 2017 in U.S. Appl. No. 15/149,850.
Extended European Search Report in EP application 14769597.7, dated Nov. 16, 2016.
Examination report No. 1 for standard patent application in AU application 2013368486, dated Dec. 6, 2016.
Examination report No. 1 for standard patent application in AU application 2013368487, dated Dec. 6, 2016.
International Search Report and Written Opinion in PCT/US13/63454, dated Apr. 18, 2014.
USPTO Notice of Allowance dated Aug. 3, 2016 in U.S. Appl. No. 15/004,144.
USPTO Office Action dated Jul. 6, 2016 in U.S. Appl. No. 15/004,144.
The Part-Time Parliament, Leslie Lamport, ACM Transactions on Computer Systems 16, (May 1998), 133-169.
Time, Clocks, and the Ordering of Events in a Distributed Systems, Leslie Lamport, Massachusettes Computer Associates, Inc., Communications of the ACM, Jul. 1978, vol. 21, No. 7.
USPTO Notice of Allowance dated Jun. 21, 2016 in U.S. Appl. No. 14/041,894.
Konstantin Shvachko et al. "The Hadoop Distributed File System", Mass Storage Systems and Technologies (MSST), 2010 IEEE 26th Symposium ON, IEEE, Piscataway, NJ, USA, May 3, 2010, pp. 1-10, XP031698650, ISBN 978-1-4244-7152-s
Extended European Search Report dated Jul. 17, 2017 in EPO Application 15773935.0.
Japanese Patent Office (JPO) Japanese language Office Action dated Nov. 21, 2017 in JP Application 2015-550382 and English language translation.

* cited by examiner

| Local Sequence 400 ||||||
|---|---|---|---|---|
| Proposer ID=0x123 | LSN | GSN | Agreement Number | Content |
| Proposer ID=0x123 | LSN | GSN | Agreement Number | Content |
| Proposer ID=0x123 | LSN | GSN | Agreement Number | Content |

*FIG. 5*

| Global Sequence 500 ||
|---|---|
| GSN #1 | Local Sequence Handle 400 |
| GSN #2 | Local Sequence Handle 400 |
| GSN #3 | Local Sequence Handle 400 |
| GSN #4 | Local Sequence Handle 400 |

*FIG. 6*

METHODS, DEVICES AND SYSTEMS FOR INITIATING, FORMING AND JOINING MEMBERSHIPS IN DISTRIBUTED COMPUTING SYSTEMS

CROSS REFERENCE TO RELATED APPLICATIONS

The present application is a continuation of U.S. non-provisional patent application Ser. No. 13/837,366 filed on Mar. 15, 2013. The present application claims the benefit of U.S. provisional application No. 61/746,940, filed Dec. 28, 2012. These applications are incorporated herein in their entireties.

BACKGROUND

Collaborative projects, which are often facilitated in a concurrent manner between globally separated resources (i.e., multi-site collaborative projects), have become commonplace for any number of different types of projects. Examples of such projects include, but are not limited to, developing software, designing jetliners and designing automobiles. Relying upon distributed resources (e.g., resources at physically different locations, logically different locations, etc.) to accelerate project time lines through optimization of human resource utilization and leveraging of global resource skill sets has proven itself to offer advantageous results.

A distributed computing solution used in facilitating a multi-site collaborative project is referred to herein as a distributed multi-site collaborative computing solution. However, a distributed multi-site collaborative computing solution is only one example of a distributed computing solution. In one example, a distributed computing solution comprises a network of computers operating an automobile. In another example, a distributed computing solution comprises a network of computers in one geographic location (a data center). In still another example, a distributed computing solution is a plurality of computers connected to one router (i.e., a subnet).

While conventional distributed computing solutions do exist, they are not without limitations that adversely impact their effectiveness, reliability, availability, scalability, transparency and/or security. In particular, with respect to conventional distributed multi-site collaborative computing solutions are limited in their ability to synchronize work from globally distributed development sites in a real-time, fault-tolerant manner. This inability forces changes in software development and delivery procedures that often cause delays and increase risk. Accordingly, cost savings and productivity improvements that should be realized from implementing a collaborative project utilizing a conventional distributed computing solution are not fully achieved.

Conventional distributed multi-site collaborative computing solutions undesirably force users to change their development procedures. For example, conventional distributed multi-site collaborative computing solutions that lack advantageous functionalities associated with real-time information management capabilities have a fundamental problem in that they cannot guarantee that local and remote Concurrent Versions Systems (CVS) repositories will be in sync at any point in time. This means that there is a great likelihood that developers at different sites can inadvertently overwrite or corrupt each other's work. To prevent such potential for overwriting and corruption, these conventional distributed multi-site collaborative computing solutions require excessive and/or error prone source code branching and manual file merging to become part of the development process. This effectively forces development work to be partitioned based on time zones and makes collaboration between distributed development teams extremely challenging, if not impossible.

A replicated state machine is a preferred enabler of distributed computing solutions. One of several possible examples of a distributed computing solution is a replicated information repository. Therefore, more particularly, a replicated state machine is a preferred enabler of replicated information repositories. One of several possible applications of replicated information repositories is distributed multi-site collaborative computing solutions. Therefore, more particularly, a replicated state machine is a preferred enabler of distributed multi-site collaborative computing solutions.

Accordingly, distributed computing solutions often rely upon replicated state machines, replicated information repositories or both. Replicated state machines and/or replicated information repositories provide for concurrent generation, manipulation and management of information and, thus, are important aspects of most distributed computing solutions. However, known approaches for facilitating replication of state machines and facilitating replication of information repositories are not without their shortcomings.

Conventional implementations of facilitating replication of state machines have one or more shortcomings that limit their effectiveness. One such shortcoming is being prone to repeated pre-emption of proposers in an agreement protocol, which adversely impacts scalability. Another such shortcoming is that the implementation of weak leader optimization requires the election of a leader, which contributes to such optimization adversely impacting complexity, speed and scalability, and requires one more message per agreement (e.g., 4 instead of 3), which adversely impacts speed and scalability. Another such shortcoming is that agreements have to be reached sequentially, which adversely impacts speed and scalability. Another such shortcoming is that reclamation of persistent storage is limited, if not absent altogether, which imposes a considerable burden on deployment because storage needs of such a deployment will grow continuously and, potentially, without bound. Another such shortcoming is that efficient handling of large proposals and of large numbers of small proposals is limited, if not absent altogether, which adversely affects scalability. Another such shortcoming is that a relatively high number of messages must be communicated for facilitating state machine replication, which adversely affects scalability and wide area network compatibility. Another limitation is that delays in communicating messages adversely impact scalability. Another such shortcoming is that addressing failure scenarios by dynamically changing (e.g., including and excluding as necessary) participants in the replicated state machine adversely impacts complexity and scalability.

Conventional implementations of facilitating replication of information repositories have one or more shortcomings that limit their effectiveness. One such shortcoming is that certain conventional multi-site collaborative computing solutions require a single central coordinator for facilitating replication of centrally coordinated information repositories. Undesirably, the central coordinator adversely affects scalability because all updates to the information repository must be routed through the single central coordinator. Furthermore, such an implementation is not highly available because failure of the single central coordinator will cause the implementation to cease to be able to update any replica of the information repository. Another such shortcoming is that, in an information repository replication implementation relying upon log replays, information repository replication is facilitated in an active-passive manner. Therefore, only one of the replicas can be updated at any given time. Because of this, resource utilization is poor because other replicas are either idle or limited to serving a read-only application such as, for example, a data-mining application. Another such shortcoming results when implementation relies upon weakly consistent replication backed by conflict-resolution heuristics and/or application-intervention mechanisms. This type of information repository replication allows conflicting updates to the replicas of the information repository and requires an application using the information repository to resolve these conflicts. Thus, such an implementation adversely affects transparency with respect to the application.

Still referring to conventional implementations of facilitating replication of information repositories have one or more shortcomings that limit their effectiveness, implementations relying upon a disk mirroring solution are known to have one or more shortcomings. This type of implementation is an active-passive implementation. Therefore, one such shortcoming is that only one of the replicas can be used by the application at any given time. Because of this, resource utilization is poor because the other replicas (i.e., the passive mirrors) are neither readable nor writable while in their role as passive mirrors. Another such shortcoming of this particular implementation is that the replication method is not aware of the application's transaction boundaries. Because of this, at the point of a failure, the mirror may have a partial outcome of a transaction, and may therefore be unusable. Another such shortcoming is that replication method propagates changes to the information from the node at which the change originated to all other nodes. Because the size of the changes to the information is often much larger than the size of the command that caused the change, such an implementation may require an undesirably large amount of bandwidth. Another such shortcoming is that, if the information in the master repository were to become corrupted for any reason, that corruption would be propagated to all other replicas of the repository. Because of this, the information repository may not be recoverable or may have to be recovered from an older backup copy, thus entailing further loss of information.

Therefore, a replicated state machine that overcomes drawbacks associated with conventional replicated state machines would be useful and advantageous. More specifically, a replicated information repository built using such a replicated state machine would be superior to a conventional replicated information repository. Even more specifically, a replicated CVS repository built using such a replicated state machine would be superior to a conventional replicated CVS repository.

Forming a membership, or a specific collection of entities from a set of known entities, is useful in distributed computing systems such as described above, so that information may be shared between specified groupings of trusted nodes.

BRIEF DESCRIPTION OF THE DRAWINGS

FIG. 5 is a block diagram showing entry structure of a global sequencer of the replicated state machine of FIG. 3.

FIG. 6 is a block diagram showing entry structure of a local sequencer of the replicated state machine of FIG. 3.

DETAILED DESCRIPTION

Figure 1:
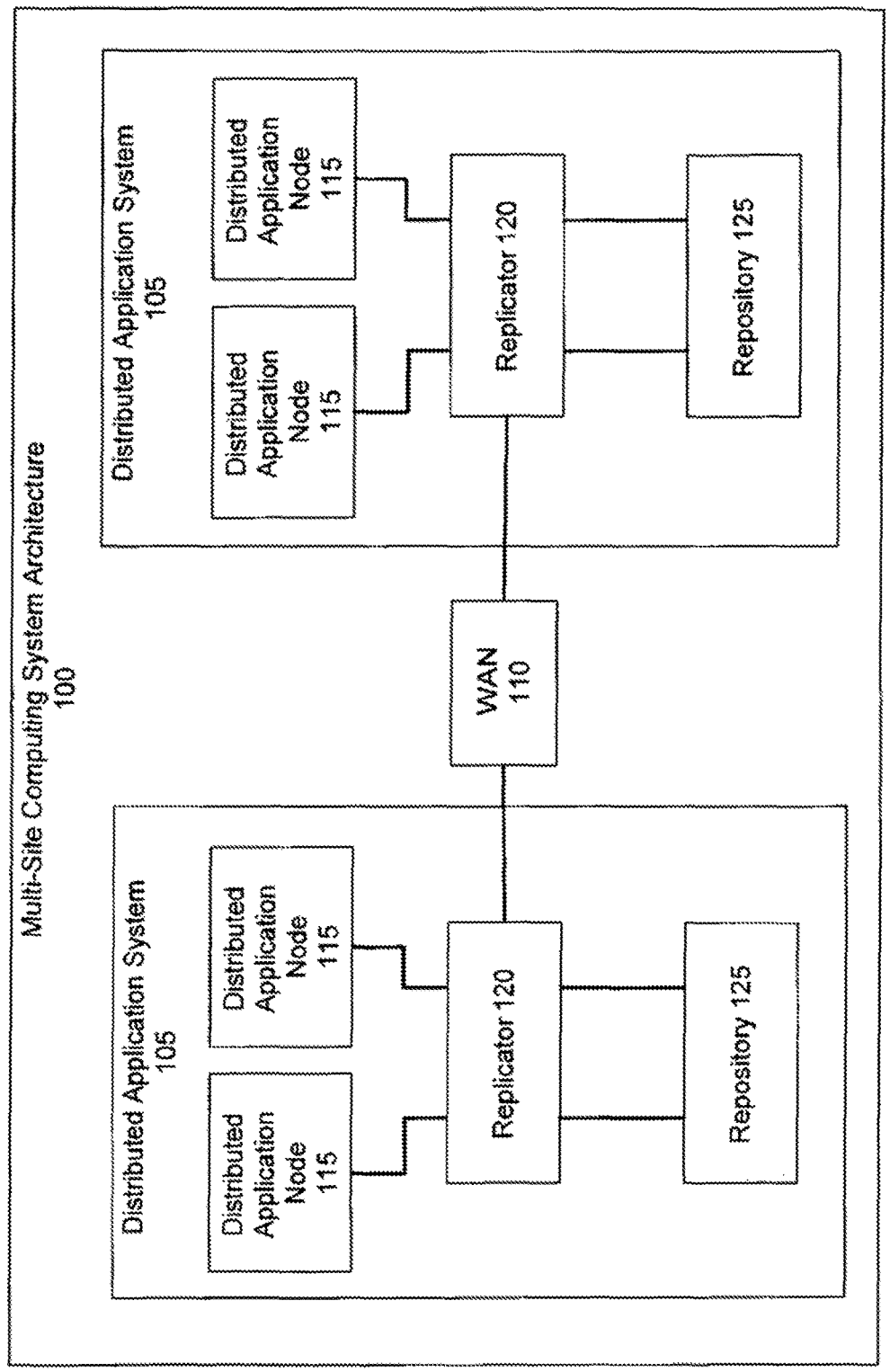
FIG. 1 is a block diagram showing functional relationships of elements within a multi-site computing system architecture in accordance with one embodiment.

Disclosed herein are various aspects for facilitating a practical implementation of a replicated state machine in a variety of distributed computing system architectures (e.g., distributed multi-site collaborative computing system architecture). A skilled person will be aware of one or more conventional implementations of a replicated state machine. For example, such a conventional implementation of a state machine is disclosed in the publication entitled "Implementing fault-tolerant services using the state machine approach: A tutorial" (pages 299-319), authored by F. B. Schneider, published in ACM Computing Surveys 22 in December of 1990 and is incorporated herein by reference in its entirety. With respect to conventional implementation of a state machine in a distributed application system architecture and as discussed below in greater detail, embodiments enhance aspects of scalability, reliability, availability and fault-tolerance.

Embodiments provide for a practical implementation of a replicated state machine in a variety of distributed computing system architectures (e.g., distributed multi-site collaborative computing system architectures). More specifically, embodiments enhance scalability, reliability, availability and fault-tolerance of a replicated state machine and/or replicated information repository in a distributed computing system architecture. Accordingly, embodiments advantageously overcome one or more shortcomings associated with conventional approaches for implementing a replicated state machine and/or a replicated information repository in a distributed computing system architecture.

In one embodiment, a replicated state machine may comprise a proposal manager, an agreement manager, a collision/back-off timer and a storage reclaimer. The proposal manager facilitates management of proposals issued by a node of a distributed application for enabling coordinated execution of the proposals by all the nodes of the distributed application that need to do so, possibly, but not necessarily including itself. The agreement manager facilitates agreement on the proposals. The collision/back-off timer precludes repeated pre-emptions of rounds in attempting to achieve agreement on the proposals. The storage reclaimer reclaims persistent storage utilized for storing proposal agreements and/or the proposals.

In another embodiment, a distributed computing system architecture may comprise a network system and a plurality of distributed computing systems interconnected via the network system. Each one of the distributed computing systems may include a respective replicated state machine and a respective local application node connected to the respective replicated state machine. The respective replicated state machine of each one of the distributed computing systems facilitates management of proposals for enabling coordinated execution of the proposals by the distributed application node of all other ones of the distributed computing systems, facilitates agreement on the proposals, precludes repeated pre-emptions of rounds in attempting to achieve agreement on the proposals and reclaims persistent storage utilized for storing at least one of proposal agreements and the proposals.

In another embodiment, a method may comprise a plurality of operations. An operation may be performed for facilitating agreement on proposals received from a local application node. An operation may be performed for precluding repeated preemptions of rounds in attempting to achieve agreement on the proposals. An operation may be performed for reclaiming respective persistent storage utilized for storing at least one of proposal agreements and the proposals.

In at least one embodiment, at least a portion of the proposals include proposed steps corresponding to implementation of an information update initiated by a node of a distributed application. An issuance order of the proposals may be preserved while concurrent agreement on the proposals is facilitated. A portion of the proposals may be proposed write steps corresponding to a respective information update and the proposal manager may assign a local sequence number to each one of the proposed write steps and create a globally unique interleaving of the proposed write steps such that all nodes of a distributed application executing the proposed write steps execute the proposed write steps in a common sequence. A local sequencer including a plurality of entries each associated with a respective one of the proposals may be provided, as may be a global sequencer including a plurality of entries each referencing a respective one of the entries of the local sequencer. Each one of the entries of the local sequencer may have a unique local sequence number assigned thereto, each one of the entries of the local sequencer may be sequentially arranged with respect to the assigned local sequence number and, after the agreement manager facilitates agreement on one of the proposals, an entry corresponding to the one proposal upon which agreement is facilitated may be created within the global sequencer in response to determining a position in which the entry is positioned within the global sequencer. The storage reclaimer may reclaim persistent storage by deleting a record for the one proposal from persistent proposal storage after the position of the entry in the global sequencer is determined and known to all nodes. The collision/back-off timer may be configured to preclude repeated pre-emptions by performing an operation of waiting for a computed pre-emption-delay duration to pass after starting a current one of the rounds for a first proposer before initiating a next one of the round for the first proposer and/or an operation of waiting for a computed round-in-progress delay duration to pass after starting a current one of the rounds for the first proposer before starting a next one of the rounds for a second proposer.

Turning now to the figures, FIG. 1 shows a multi-site computing system architecture in accordance with one embodiment (i.e., referred to herein as the multi-site computing system architecture 100) may include a plurality of distributed application systems 105 interconnected by a Wide Area Network (WAN) 110. Each one of the distributed application systems 105 may include a plurality of distributed application nodes 115 (e.g., an application running on a workstation), a replicator 120 and a repository replica 125. The replicator 120 of each distributed application system 105 may be connected between the WAN 110, the distributed application nodes 115 of the respective distributed application system 105 and the repository replica 125 of the respective distributed application system 105.

In one embodiment, each repository replica 125 is a Concurrent Versions System (CVS) repository. CVS is a known open source code versioning system. CVS, like most other source code versioning systems, is designed to run as a central server to which multiple CVS clients (e.g., a distributed application nodes 115) connect using a CVS protocol over, for example, Transmission Control Protocol (TCP). The CVS server, as implemented, forks a process per client connection to handle a CVS request from each client. Accordingly, the replicator 120 and the repository replica 125 allows for multiple replicas of a CVS repository. While a CVS information repository is one example of an information repository useful with one embodiment, the subject matter of the present disclosure is useful in replicating other types of information repositories. Databases and file systems are examples of other such types of information repositories. Accordingly, usefulness and applicability of embodiments are not limited to a particular type of information repository.

As is discussed below in greater detail, each replicator 120 may be configured for writing information updates from its respective distributed application system 105 to the repository replica 125 of each other distributed application system 105. Each replicator 120 may be the intermediary that acts as an application gateway between CVS clients (i.e., a respective distributed application node 115) and a given CVS server (i.e., the respective repository replica 125). Each replicator 120 coordinates with other peer replicators to ensure that all of the repository replicas 125 stay in sync with each other.

Unlike conventional solutions, the multi-site computing system architecture 100 does not rely on a central transaction coordinator that is known to be a single-point-of-failure. The multi-site computing system architecture 100 provides a unique approach to real-time active-active replication, operating on the principle of one-copy equivalence across all CVS repository replicas of a distributed application system. Accordingly, in accordance with one embodiment, every repository replica is in sync with every other repository replica in a real-time manner, so users at every node of the distributed application system (i.e., distributed application node) are always working from the same information base (e.g., programmers working from the same code base).

Through integration of the replicator 120 with the respective repository replica 125, each repository replica becomes an active node on the WAN 110 with its own transaction coordinator (i.e., the respective replicator 120). Each distributed transaction coordinator accepts local updates and propagate them to all of the other repository replicas 125 in real-time. Accordingly, all users within the multi-site computing system architecture 100 are effectively working from the same repository information (e.g., a single CVS information repository) regardless of location. To this end, a multi-site computing system architecture in accordance with one embodiment is a cost-effective, fault-tolerant software configuration management (SCM) solution that synchronizes work from globally distributed development teams in real-time.

When network or server failures occur, developers can continue working. Changes are logged in a transaction journal of the local one of the replicators 120. The transaction journal is similar in function to a database redo log. When connectivity is restored, the local one of the replicators 120 reaches out to the replicator 120 of other ones of the distributed application systems 105 to bring the local one of the repository replicas 125 up to date, as well as apply the changes captured in the local transaction journal while the network or system was down. Recovery may be implemented automatically, without any intervention from a CVS administrator. This self-healing capability ensures zero loss of data, no lost development time, and eliminates the risk of human error in a disaster recovery scenario.

The benefits of working from essentially the same repository information include not having to change development procedures when development moves abroad, not having to sit idle while waiting for large builds to complete when work from multiple sites is being integrated, being able to detect development problems earlier and spending less resources (e.g., reducing redundant resource utilization) in Quality Assurance. In addition, disaster recovery isn't an issue because the integrated self-healing capability provides disaster avoidance. Work is never lost when a system goes down.

As disclosed above, implementation of a replicated state machine in accordance with one embodiment advantageously impacts scalability, reliability, availability and fault-tolerance of such a replicated state machine. By advantageously impacting scalability, reliability, availability and fault-tolerance, the present provides a practical approach to implementing a replicated state machine in a multi-site computing system architecture. In implementing a replicated state machine in accordance with one embodiment, all or a portion of the following objects will be met: allowing nodes of a distributed computing system of computers to evolve their state in a coordinated manner; allowing the consistency of a distributed system of computers to be preserved despite arbitrary failures or partial failures of the computer networks, computers or computing resources; allowing a reliable system of distributed application nodes to be created out of components with modest reliability; ensuring the termination of the agreement protocol with probability as a function of time asymptotically approaching 1, despite collisions in the agreement protocol; eliminating collisions in the agreement protocol under normal operating conditions; improving the efficiency of the agreement protocol; reducing and bounding the memory and disk usage of the replicated state machine; reducing the usage of network resources by the replicated state machine; increasing the throughput of state transitions realizable by the replicated state machine; and enabling more efficient management of memory and disk resources by the distributed application nodes served by the replicated state machine.

Figure 2:
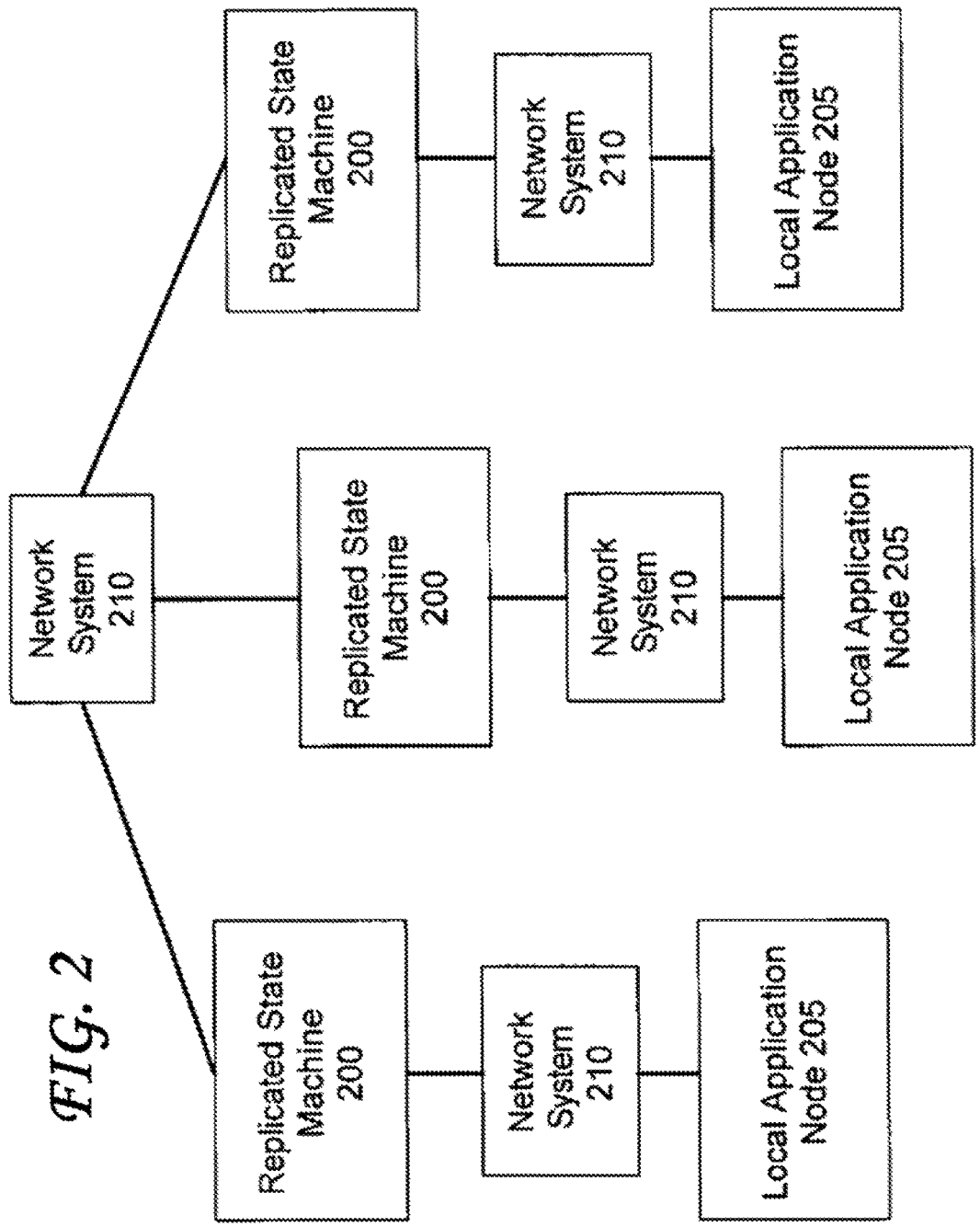
FIG. 2 is a high-level block diagram showing deployment of elements making up a multi-site computing system architecture in accordance with one embodiment.

As shown in FIG. 2, multi-site computing functionality in accordance with one embodiment is facilitated by a plurality of replicated state machines 200 that interact with each other and with a respective local application node 205 through a network system 210. Preferably, but not necessarily, each local application node 205 may be that of a distributed application and serves as a proposal proposer or proposal acceptor at any given point in time. In one embodiment, the network system 210 may include a Wide Area Network (WAN) connected between the replicated state machines 200 and a respective Local Area Network (LAN) connected between each replicated state machine 200 and the respective local application node 205. For example, each replicated state machine 200 and its respective local application node 205 are situated at a respective site for a multi-site collaborative computing project. The LAN-portion of the network system 210 facilitates sharing of information on a local basis (i.e., between each replicated state machine 200 and its respective local application node 205) and the WAN-portion of the network system 210 facilitates sharing of information on a global basis (i.e., between the replicated state machines 200). While a LAN, a WAN or both are examples of constituent components of a network system in accordance with one embodiment, embodiments are not limited to a particular configuration of network system. For example, other embodiments of a network system in accordance with one embodiment include an ad-hoc network system including embedded computers in an automobile, a network system comprising a plurality of subnets in a data center and a network system including a subnet within a data center.

Figures 3, 4:
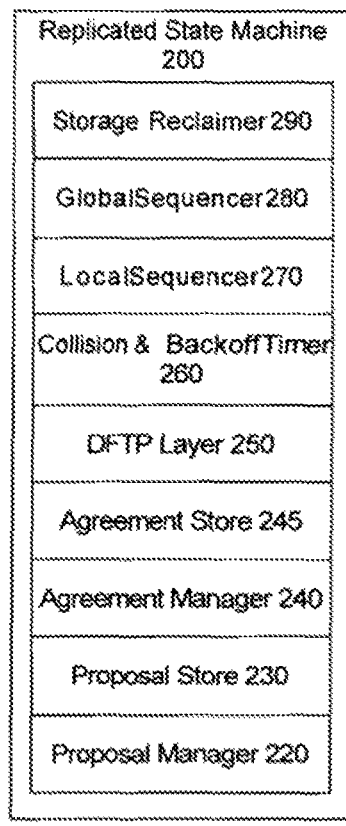
FIG. 3 is a block diagram showing functional components of a replicated state machine in accordance with one embodiment.
FIG. 4 is a block diagram showing a proposal issued by a local application node in accordance with one embodiment.

FIG. 3 is a block diagram showing functional components of each replicated state machine 200 shown in FIG. 2. Each replicated state machine 200 may include a proposal manager 220, persistence proposal storage 230, an agreement manager 240, an agreement store, 245, a Distributed File Transfer Protocol (DFTP) layer 250, a collision & back-off timer 260, a local sequencer 270, a global sequencer 280 and a storage reclaimer 290 (i.e., a persistent storage garbage collector). The proposal manager 220, persistence proposal storage 230, the agreement manager 240, the agreement store, 245, the DFTP layer 250, the collision & back-off timer 260, the local sequencer 270, the global sequencer 280 and the storage reclaimer 290 are interconnected to at least a portion of each other for enabling interaction therebetween. As will be seen in the following discussion, each of the replicated state machine functional components supports advantageous functionality in accordance with one embodiment.

Proposal Management

Each local application node 205 proposes a sequence of proposals to the respective replicated state machine 200. The sequence of proposals proposed by each local node 6 constitutes a local sequence of that respective local node 205, which may be maintained within the local sequencer 270 of the respective replicated state machine 200. The proposal manager 220 of each replicated state machine 200 organizes the respective sequence of proposals into a single respective global sequence of proposals, which may be maintained within the global sequencer 280 of the respective replicated state machine 200. Each global sequence of proposals has the following properties: each proposal of each local sequence occurs exactly once in the respective global sequence, the relative ordering of any two proposals in a local sequence may be optionally preserved in the respective global sequence, and the global sequences (with or without local ordering preserved) associated with all of the local application nodes 205 are identical.

When a thread of the local application node 205 proposes a proposal (e.g., write steps) to the respective replicated state machine 200, the replicated state machine 200 assigns a local sequence number to the proposal. That replicated state machine 200 then determines an agreement number for that proposal. As will become apparent from the discussions below, the agreement number determines the position of a respective proposal in the global sequence. The replicated state machine 200 then saves a record of the proposal in its persistent proposal storage 230. The replicated state machine 200 then returns control of the local application node's thread back to the local application node, so the thread may be available for use by the local application, and not idle while the agreement protocol executes. The replicate state machine then initiates an agreement protocol for the proposal via the agreement manager 240. When the agreement protocol terminates, the replicated state machine 200 compares the agreement reached by the agreement protocol with proposed agreement contained within the proposal. If the agreement reached by the agreement manager 240 may be the same as that of the proposal, the replicated state machine 200 concludes processing of the proposal. Otherwise, the replicated state machine 200 repeatedly attempts agreement on the proposal using a new agreement number until the agreement reached by the agreement manager may be the same as that of the proposal. Upon the conclusion of an agreement, each local application node 205 enqueues the now agreed upon proposal in its global sequence. Thereafter, each local application node 205 of the distributed application dequeues and executes the proposals contained within the global sequence.

FIG. 4 shows an embodiment of a proposal in accordance with one embodiment, which is referred to herein as the proposal 300. The proposal 300 may include a proposer identifier 320 (i.e., an identifier of a local application node), a local sequence number (LSN) 330, a global sequence number (GSN) 340, an agreement number 350 and proposal content 360. Preferably, but not necessarily, the proposals issued by each local application node 205 have the structure of the proposal 300.

FIG. 5 shows an embodiment of a local sequence in accordance with one embodiment, which is referred to herein as the local sequence 400. The local sequence 400 may include the contents of each one of the proposals for the respective local application node 205. More specifically, such contents include the proposer identifier, the local sequence number (LSN), the global sequence number (GSN), the agreement number and the proposal content. Preferably, but not necessarily, the local sequence associated with each replicated state machine 200 have the structure of the local sequence 400.

FIG. 6 shows an embodiment of a global sequence in accordance with one embodiment, which is referred to herein as the global sequence 500. The global sequence may include the global sequence number for a series of proposals and a local sequence handle. In one embodiment, the local sequence handle may be a pointer to the respective local sequence (i.e., as depicted, the local sequence 400). In another embodiment, the local sequence handle may be a key to a table of local sequences. Preferably, but not necessarily, the global sequence associated with each replicated state machine 200 have the structure of the global sequence 500.

Concurrent Agreements

The replicated state machines 200 depicted in FIGS. 2 and 3, which are replicated state machines in accordance with one embodiment, incorporate a concurrent agreement mechanism that allows agreement on multiple proposals from a proposer to progress concurrently while, optionally, preserving the order in which the proposer submitted the proposals. In contrast, conventional replicated state machines attempt agreement on a proposal after reaching agreement on a previous proposal. This conventional replicated state machine methodology ensures that a conventional replicated state machine preserves the local order of proposals. Thus, if a proposer first proposes proposal A and then proposes proposal B, the conventional replicated state machine ensures that proposal A is agreed upon and before proposal B. However, unlike a replicated state machine implementing a back-off mechanism in accordance with one embodiment, this convention methodology slows down the operation of the conventional replicated state machine as agreement on proposal B may not be initiated until proposal A has reached agreement.

Referring now to aspects of one embodiment, each object (i.e., an entry) in the global sequence may be sequentially numbered. The number associated with an object in the global sequence identifies its position relative to the other objects in the global sequence. For example, an object numbered 5 precedes an object numbered 6 and may be preceded by an object numbered 4. Furthermore, each object in the global sequence contains a handle to a local sequence, such as the local sequence handle 400 shown in FIG. 5. If the application does not require preservation of the submission order (i.e., order as issued from source), each object in the global sequence contains the proposal itself. In this case, the proposal may be obtained directly from the global sequence rather than indirectly via the local sequence. In one of several possible embodiments, the handle to the local sequence may be a pointer to the local sequence. In another embodiment, the handle to the local sequence may be a key to a table of local sequences.

Referring now to FIGS. 2 and 3, each local sequence contains the proposals of the replicated state machine 200 proposed by one of the proposers of the replicated state machine 200. Each local application node 205 of the replicated state machine 200 maintains a local sequence for each of the proposers associated with the replicated state machine 200. The objects in the local sequence are sequentially numbered. The number associated with an object in the local sequence identifies its position relative to the other objects in the local sequence. For example, the object numbered 5 precedes the object numbered 6 and may be preceded by the object numbered 4. Each object in the local sequence contains a proposal of the replicated state machine 200.

At each local application node 205 of the replicated state machine 200, after agreement has been reached on a proposal, the proposal may be added to the global sequence. The identity of the proposer (e.g., proposer ID 320 in FIG. 4) may be used as the key to look up a local sequence from the table of local sequences. The local sequence number (LSN) of the proposal determines the position of the proposal in the local sequence. The proposal may then be inserted in the determined position in the local sequence. The agreement number of the proposal (e.g., agreement number 350 in FIG. 4) determines the position of the proposal in the global sequence. A handle to the local sequence may be inserted in the determined position in the global sequence (i.e., based on the agreement number). The GSN is an optional bookkeeping field to associate with the proposal for designating the proposal's actual position in the global sequence when it is consumed as described in the paragraph below.

In one embodiment, a dedicated thread consumes the global sequence. The thread waits until the next position in the global sequence is populated. The thread then extracts the local sequence stored in that position of the global sequence. The thread then waits until the next position in the local sequence is populated. The thread then extracts the proposal of the replicated state machine 200 stored in that position of the local sequence. A skilled person will appreciate that the proposals will not necessarily be extracted according to the sequence of agreement numbers, but will be extracted in exactly the same sequence at all the application nodes. This extraction sequence may be recorded for bookkeeping convenience in the GSN field, but is otherwise not essential to the operation of the replicated state machine 200. For example, assume that an application node (A) submits its first two proposals to the replicated state machine (LSN 1 and LSN 2). Assume further that the replicated state machine happened to reach agreement on LSN 2 before reaching agreement on LSN 1. Hence, the agreement number for A:1 (LSN 1 from application node A) is 27 and the agreement number for LSN 2 is 26 (i.e., there were a total of 25 preceding agreements on proposals from other application nodes and no intervening agreements on proposals from other application nodes between A:1 and A:2). Using the above method, A:1 will be extracted from the global sequence in position 26, and A:2 in position 27. Thus, the GSN will respect LSN order, but the agreement number does necessarily not need to do so. This methodology enables a replicated state machine in accordance with one embodiment to process agreements concurrently.

The thread then applies the proposal of the replicated state machine 200. In an embodiment, application of the proposal may be accomplished by invoking a call-back function registered by an application of the replicated state machine 200.

Back-Off & Collision Avoidance

A replicated state machine in accordance with one embodiment (e.g., the replicated state machine 200) may include a back-off mechanism for avoiding repeated preemption of proposers (e.g., local application nodes 205) in the agreement protocol of the agreement manager 240. In contrast, when a round initiated by a first proposer pre-empts a round initiated by a second proposer, a conventional replicated state machines allows the pre-empted proposer to immediately initiate a new round with a round number higher than that of the pre-emptor. Undesirably, this conventional methodology sets the stage for repeated preemptions of rounds, which can lead an agreement protocol to thrash for a unacceptably long time (e.g., perpetually).

In facilitating back-off in accordance with one embodiment, when a round is pre-empted, the proposer computes the duration of a pre-emption-delay. The proposer then waits for that computed duration before initiating the next round in accordance with a conventional algorithm for initiating such a next round.

In facilitating collision avoidance in accordance with one embodiment, when a first proposer senses that a second proposer has initiated a round, the first proposer computes the duration of a round-in-progress-delay. The first proposer refrains from initiating a round until the duration of the computed delay has expired.

In an embodiment, a given delay grows exponentially with subsequent pre-emptions of a round. In addition, the delay is preferably randomized.

There are several possible methods that can be used to determine the duration of a given delay. One source of inspiration for viable methods is the literature on Carrier Sense Multiple Access/Collision Detection (CSMA/CD) protocols for non-switched Ethernet. A CSMA/CD protocol is a set of rules determining how network devices respond when two network devices attempt to use a data channel simultaneously.

In one of several possible embodiments, the following method determines the duration of a calculated delay. An administrator deploying the replicated state machine 200 configures four numerical values. For the purpose of the description of this embodiment, the values are called A, U, R and X. In a valid configuration, the Value R is greater than zero, and less than one; the value A is greater than zero; the value X is greater than one; the value U is greater than the value A. The execution time of the agreement protocol may be estimated. One of several possible estimators of the execution time of the agreement protocol may be a moving-window average of past execution times of the agreement protocol. For the purpose of this discussion, this estimated value will is called E. A is multiplied by U to determine the value M. The greater of the two values A and E is selected. For the purpose of this discussion, this selected value is called F. F is multiplied by X to determine the value C. A random value V is generated from a uniform distribution between zero and C times R. If C is greater than M, V is subtracted from C to compute D. Otherwise, V is added to C to compute D.

The computed value D may be used as the round-in-progress-delay. It may be also used as the pre-emption delay the first time a local application node 205 is pre-empted in the execution of an agreement protocol instance. Each subsequent time the local application node 205 may be pre-empted in the execution of the agreement protocol instance, a new value D may be computed using the old value D in place of the value A in the above method. The new value D may be used as the pre-emption delay.

Reclaiming Persistent Storage

A replicated state machine in accordance with one embodiment (e.g., the replicated state machine 200) reclaims persistent storage used to ensure its fault tolerance and high availability. Referring to FIGS. 2 and 3, the storage reclaimer 290 deletes a record of a proposed proposal from the proposal store 230 after the replicated state machine 200 has determined the position of the proposed proposal in the global sequence and all application nodes are informed of this position. At periodic intervals, each local application node 205 sends a message to each other local nodes 205 indicating the highest contiguously populated position in its copy of the global sequence. At periodic intervals, the storage reclaimer 290 deletes all agreements up to the highest contiguously populated position in all copies of the global sequence that are no longer required by the local application node. In this manner, each replicated state machine 200 reclaims persistent storage.

Weak Reservations

A replicated state machine in accordance with one embodiment (e.g., the replicated state machine 200) provides an optional weak reservation mechanism to eliminate pre-emption of proposers under normal operating conditions. Referring to FIGS. 2 and 3, each proposer driving a respective replicated state machine 200 may be contiguously numbered. For example, if there are three proposers, they may be numbered 1, 2, and 3. A proposer's number determines which proposals of the respective replicated state machine 200 that a corresponding proposer will drive. If a proposer's number is M, and if there are N proposers, the proposer will drive proposals numbered M+(k.times.N) (i.e., M plus k multiplied by N, for all integer values of k greater than or equal to 0). To allow a distributed application system to make progress when all of the proposers of such system are not available, if a proposal of the replicated state machine 200 may not be determined in a timely manner, any proposer associated with the respective replicated state machine 200 may propose a "no operation" (i.e., no-op) for that proposal. To make this optimization transparent to the distributed application, the replicated state machine 200 does not deliver the no-op proposals to the distributed application. No operation refers to a computation step that, in general, does not have any effect, and in particular, does not change the state of the associated replicated state machine.

Distinguished and Fair Round Numbers

A replicated state machine in accordance with one embodiment ensures that one of a plurality of competing proposers will not be pre-empted when using the same round number for competing proposals. In contrast, conventional replicated state machines do not include a mechanism that ensures that one of a plurality of competing proposers will not be pre-empted when using the same round number for competing proposals. A round number in such conventional replicated state machines may be a monotonic value, which makes it possible for all of the proposers to be pre-empted.

In addition to the monotonic component, in one embodiment, the round number may contain a distinguished component. In one embodiment, a small distinct integer may be associated with each proposer of each replicated state machine 200. The distinct integer serves to resolve conflicts in favor of the proposer with the highest distinguished component. In addition to the monotonic component and the distinguished component, the round number contains a random component. A round number of this fashion ensures that one of a plurality of competing proposers will not be pre-empted when using the same round number for competing proposals (i.e., via the distinct component of the round number) and ensures that the conflict resolution does not perpetually favor or disfavor any particular one of the proposers (i.e., via the random component of the round number).

A mechanism to compare two round numbers operates as follows. The round number with the larger monotonic component is larger than the other. If the monotonic components of the two round numbers are equal, the round number with the larger random component is larger than the other. If the two comparisons above do not distinguish the round numbers, the round number with the larger distinguished component is larger than the other. If the three comparisons above do not distinguish the round numbers, the round numbers are equal.

Reclaiming Persistent Storage Efficiently

Referring to FIGS. 3 and 4, the records in the persistent proposal store 230 of a replicated state machine 200 are organized into groups. Each group stores records of proposed proposals with contiguous local sequence numbers 330. For example, records with local sequence numbers #1 through #10000 may belong in group-1, records with local sequence numbers #10001 through #20000 may belong in group-2, and so on.

Referring to groups of persistent proposals, each group may be stored in such a way that the storage resources used by the entire group can be efficiently reclaimed. For example, in a file-based storage system, each group uses its own file or set of files.

Still referring to groups of persistent proposals, the storage reclaimer 290 tracks requests to delete individual records, but does not delete individual records at the time of the requests. When the accumulated requests to delete individual records include all the records in a group, the storage reclaimer 290 efficiently reclaims the storage resources used by the group. For example, in a file-based storage system, the file or set of files used by the group may be deleted.

The records in the agreement store 245 of the replicated state machine 200 are organized into groups. Each group stores records of agreement protocol instances with contiguous agreement instance numbers 150. For example, records with agreement instance numbers #1 through #10000 may belong in group-1, records with agreement instance numbers #10001 through #20000 may belong in group-2, and so on.

Referring to groups of agreement protocol instances, each group may be stored in such a way that the storage resources used by the entire group can be efficiently reclaimed. For example, in a file-based storage system, each group uses its own file or set of files.

Still referring to groups of agreement protocol instances, the storage reclaimer 290 tracks requests to delete individual records, but does not delete individual records at the time of the requests. When the accumulated requests to delete individual records include all the records in a group, the storage reclaimer 290 efficiently reclaims the storage resources used by the group. For example, in a file-based storage system, the file or set of files used by the group may be deleted.

Handling Small Proposals Efficiently

Referring to FIGS. 3 and 4, a replicated state machine in accordance with one embodiment (e.g., the replicated state machine 200) batches the transmission of the proposed proposals to the replicated state machine 200 from an originating one of the local application nodes 205 to recipient ones of the local application nodes 205. Such a practice allows a replicated state machine in accordance with one embodiment to efficiently utilize a packet-based communication protocol in a situation where the size of proposals of the replicated state machine are small relative to the size of a packet of data in the underlying packet-based communication protocol used by the replicated state machine.

In one embodiment, such a batch of proposals may be treated as a single proposal by the agreement protocol. In this manner, at each local node 205, while a respective replicated state machine 200 is determining the agreement number 350 of a first batch of proposed proposals, the proposals proposed at the respective local application node 205 may be accumulated in a second batch of proposals. When the agreement number 150 of the first batch is determined, the replicated state machine 200 initiates the determination of the agreement instance number 350 of the second batch, and the proposals proposed at that local application node 205 are accumulated in a third batch - - - and so on.

Handling Large Proposals 110 Efficiently

To reduce network bandwidth for large proposals, a replicated state machine in accordance with one embodiment allows proposals to be tagged by a short proposal id (e.g., a 16 bytes globally unique id) and/or proposals can be encoded into a format referred to as file based proposal. In contrast, large proposals present a problem to conventional replicated state machines in that such large proposals are essentially sent multiple time over a network as driven by the agreement protocol of a conventional replicated state machine. Such multiple transmission may not be preferred because the size of large proposals can be several megabytes or even gigabytes.

When transmitting large proposals, one embodiment only transmits short proposal identifiers once the actual proposal has been transmitted successfully to a network end-point. File-based proposals essentially carry an in-memory file pointer while the actual proposal content may be kept on disk in a file. When transporting such a file-based proposal on the network, a replicated state machine in accordance with one embodiment uses an efficient fault-tolerant file streaming protocol. Such transporting may be handled by the DFTP layer 250 of a replicated state machine 200 (FIG. 3). The DFTP layer 250 tracks the pair-file based proposal and a network end-point. It ensures a file-based proposal is only transmitted once to a network end-point. In the event of failures leading to partial transfers, the file-based proposal can be retrieved from any available end-point that has the required portion of the file.

In one embodiment, implementation of DFTP uses native sendfile or memory-mapped files for efficient file transfer if the operating system supports these features. If the original sender is not reachable by a node that requires a file, that node will locate an alternate sender—a different node in the system which happens to have the file. When operating over the TCP protocol, DFTP uses multiple TCP connections to take best advantage of high bandwidth connections that are also subject to high latency. In addition, to take best advantage of high bandwidth connections that are also subject to high latency, a window size of the TCP protocol can be appropriately and/or desirably tuned.

Turning now to a discussion of scalable and active replication of information repositories, in one embodiment, implementation of such replication in accordance with one embodiment utilizes the abovementioned replicated state machine. More specifically, providing for such replication in accordance with one embodiment advantageously impacts scalability, reliability, availability and fault-tolerance of such a replicated state machine. Accordingly, implementation of a replicated state machine in accordance with one embodiment advantageously impacts such replication in a distributed computing system architecture. In implementing replication of an information repository in accordance with one embodiment, all or a portion of the following objects will be met: enabling replicating a CVS repository, a database, or any information repository in general; allowing concurrent use, including modification, of all the replicas of an information repository; preserving the consistency of the replicas despite essentially arbitrary failures or partial failures of the computer networks used in the replication infrastructure; preserving the consistency of the replicas despite essentially arbitrary failures or partial failures of the computers or computing resources associated with the replicas; ensuring the continuous availability of the information repository despite significant failures of the nature described above; allowing geographic distribution of replicas such that there are no constraints on how far apart (e.g., on different continents) or how close (e.g., in the same data center, or even in the same rack) the replicas are to each other; allowing all the replicas of the information repository in conjunction to handle a higher load than can be handled by one instance of the repository; preserving one-copy-equivalence of the replicas; enabling the replication of the information repository without introducing a single point of failure in the system; allowing the replication of an information repository without modifications to the implementations of the information repository; allowing the replication of an information repository without modifications to the implementations of the clients of the information repository; offering clients of a CVS repository response times of a collocated local CVS repository via rotating quorum of replica; reducing the network communication between clients of CVS repository and remote CVS repository by a factor of about 3 on a wide area network (e.g., about 4.5 round trips to about 1.5 round trips); allowing remote recovery of failed replicas in an automated fashion without requiring administrator's intervention; and ensuring distributed state cleanup of all replicas in an automated fashion without requiring administrator's intervention.

Figure 7:
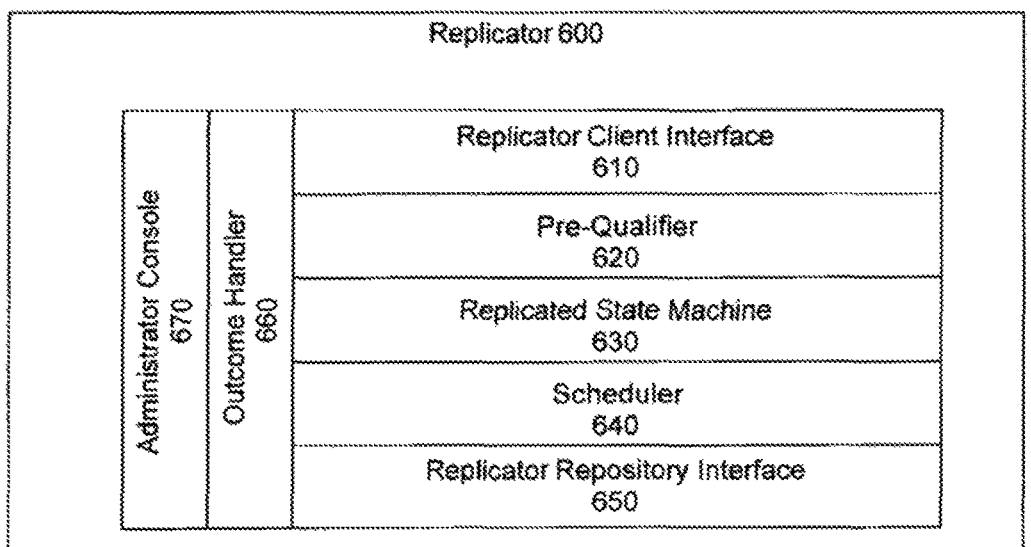
FIG. 7 is a block diagram showing a replicator in accordance with one embodiment.

Referring to FIG. 7, one embodiment of a replicator in accordance with one embodiment is shown, which is referred to herein as the replicator 600. The replicator 600 consists of a plurality of functional modules, including a replicator client interface 610, a pre-qualifier 620, a replicated state machine 630, a scheduler 640, a replicator repository interface 650, an outcome handler 660 and an administrator console 670. The replicator client interface 610, the pre-qualifier 620, the replicated state machine 630, the scheduler 640, the replicator repository interface 650, the outcome handler 660 and the administrator console 670 are each interconnected to at least a portion of the other modules for enabling interaction therebetween. The replicated state machine 200, whose functionality was discussed in reference to FIGS. 2-6, is an example of the replicated state machine 630 of the replicator 600. Thus, the replicated state machine 630 is reliable, available, scalable and fault tolerant.

Figure 8:
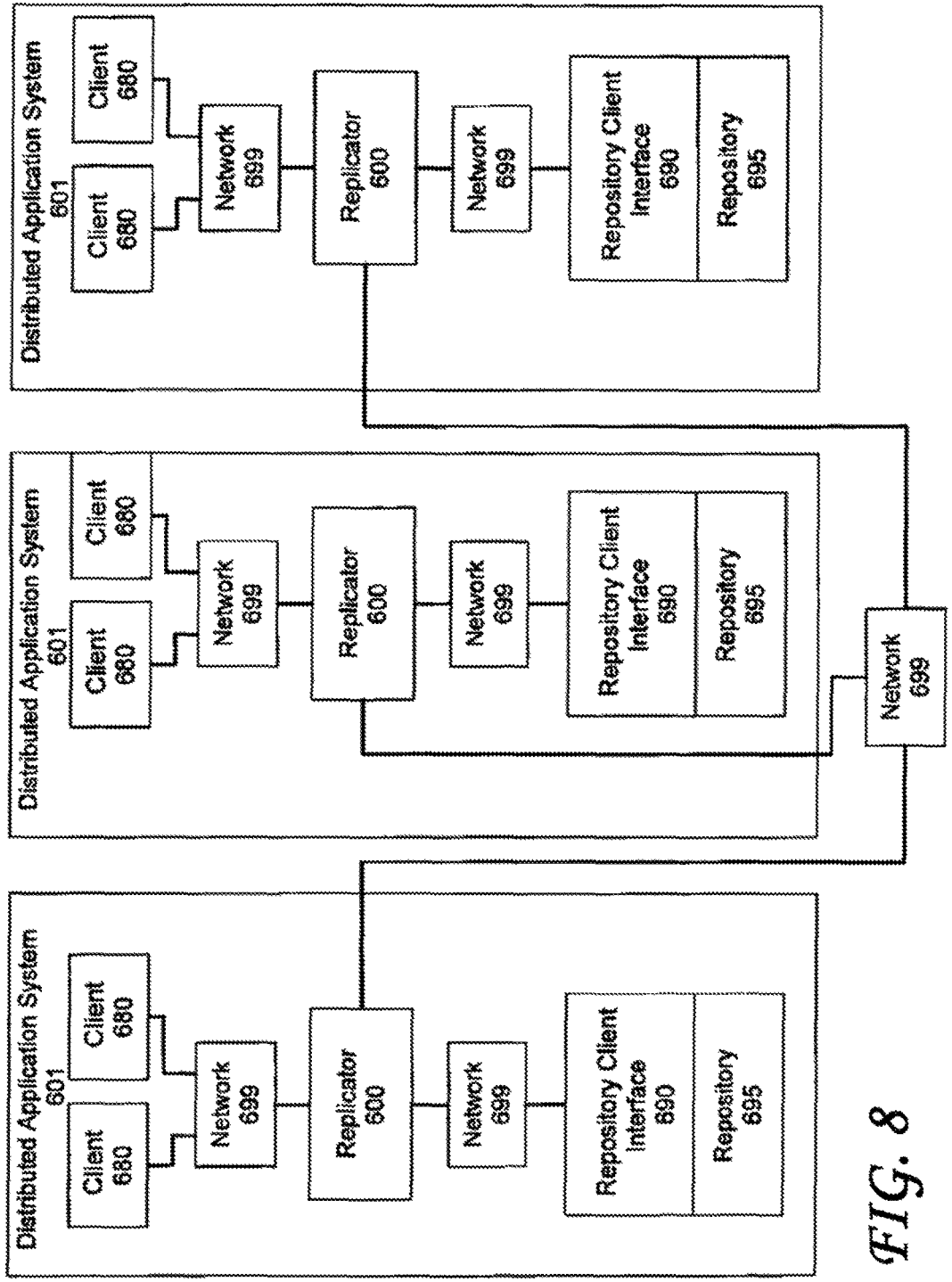
FIG. 8 is a detailed-level block diagram showing deployment of elements making up a multi-site computing system architecture in accordance with one embodiment.

FIG. 8 shows an embodiment of deployment of the replicator 600 within a multi-site computing system architecture in accordance with one embodiment. The multi-site computing system architecture may include a plurality of distributed application systems 601. Each distributed application system 601 may include a plurality of clients 680, a replicator 600, a repository client interface 690, a repository 695 (i.e., an information repository) and a network 699. The network 699, which is generally not necessarily a component of any one plurality of distributed application systems 601, may be connected between the clients 680 of each distributed application system 601 and the respective replicator 600 and between the repository client interface 690 of each distributed application system 601 and the respective replicator 600, thus interconnecting the clients 680, replicator 600 and repository 695 of each distributed application system 601 for enabling interaction such components of each distributed application system 601. The network may be also connected between the replicator 600 of all of the distributed application system 601, thus enabling interaction between all of the distributed application system 601. The networks 699 can be isolated from each other, but they do not need to be. For example, the same network can fulfill all three of the above disclosed roles.

As shown in FIG. 8, three clients 680 are "near" each one of the repositories 695 (i.e., a system element of the distributed application systems 601 comprising a respective repository 695). By near, it is meant that a particular one of the clients 680 near a particular one of the repositories 695 would prefer to access that particular one of the repositories 695. Alternatively, that particular one of the clients 680 could potentially access the repository 695 of any one of the distributed application systems 601.

The operators of a distributed computing system in accordance with one embodiment include the users of the client 680 and the administrator or administrators of the distributed application systems 601. The users of the client 680 follow the instructions of their client user's manual. A user could remain oblivious to the fact that they are using a replicator in accordance with one embodiment, as many of the advantageous aspects of embodiments may be transparent to the user. An administrator, in addition to the standard tasks of administering the repository 695 itself, will configure the networks accordingly, as needed and if needed for operation.

The replicated state machines 630 of each distributed application system 601 communicate with each other over the network 699. Each replicator repository interface 650 interacts through the network 699 with the repository 695 of the respective distributed application system 601. The client 680 interacts through the network 699 with the replicator client interface 610. Optionally, a product such as, for example, Cisco Systems Director may be used to enable a particular client 680 of a particular one of the distributed application systems 601 to fail over to any of the other distributed application systems 601, if the distributed application system 601 comprising the client 680 may be not available at a particular time for providing a required functionality.

Referring now to FIGS. 7 and 8, the replicator client interface 610 may be responsible for interfacing with a particular one of the clients 680 (i.e., the particular client 680) associated with a targeted repository 695. The replicator client interface 610 reconstructs the commands issued by the particular client 680 over the network 699 and delivers the commands to the pre-qualifier 620. The pre-qualifier 620 enables efficient operation of the replicator 600, but may not be required for the useful and advantageous operation of the replicator 600.

For each command, the pre-qualifier 620 may optionally determine whether the command is doomed to fail, and if so, determine an appropriate error message or error status to be returned to the particular client 680. If so, that error message or error status may be returned to the replicator client interface 610 and the replicator client interface 610 delivers that error message or error status to the particular client 680. Thereafter, the command may not be processed any further by the replicator 600.

For each command, the pre-qualifier 620 may optionally determine whether the command can bypass the replicated state machine 630 or both the replicated state machine 630 and the scheduler 640. If the pre-qualifier 620 did not determine that the replicated state machine 630 could be bypassed, the command may be delivered to the replicated state machine 630. The replicated state machine 630 collates all of the commands submitted to it and its peer replicated state machines 630 at each other associated replicator 600 of the distributed application system 601. This sequence of operations may be assured to be identical at all the distributed application systems 601. At each of the distributed application systems 601, the respective replicated state machine 630 delivers the commands collated as above, in sequence, to the respective scheduler 640.

The Scheduler 640 performs a dependency analysis on the commands delivered to it, and determines the weakest partial ordering of commands that would still ensure one-copy serializability. Such dependency analysis and one-copy serializability are disclosed in the prior art reference of Wesley Addison entitled "Concurrent Control & Recovery in Database Systems" and published in a reference book by P. Berstein et. al. The scheduler 640 then delivers the commands to the replicator repository interface 650, concurrently when permitted by the constructed partial order, sequentially otherwise.

The replicator repository interface 650 delivers the commands to the repository 695. In response, one of three outcomes ensues. Thereafter, the replicator repository interface 650 delivers the ensuing outcome to the outcome handler 660.

A first one of the outcomes may include the repository 695 returning a response to the command. This response contains a result, a status or both, indicating that nothing went wrong during the execution of the command. If the command originated locally, the outcome handler 660 delivers the response to the replicator client interface 610, which in turn delivers the response to the client 680. If the command originated at a replicator of a different distributed application system 601, the response is preferably discarded.

A second one of the outcomes may include the repository 695 responds with an error status. The outcome handler 660 determines whether the error status indicates a deterministic error in the repository 695 (i.e., whether the same or comparable error would occur at each of the other distributed application systems 601). If the determination of the error may be ambiguous, the outcome handler 660 attempts to compare the error with the outcome at other distributed application systems 601. If this does not resolve the ambiguity, or if the error may be unambiguously non-deterministic, the outcome handler 660 will suspend the operation of the replicator 600 and inform the operator via the administrator console 670 (i.e., via issuance of a notification via the administrative console 670).

In the case where the replicator is a CVS replicator, as is discussed below in reference to CVS-specific functionality, a list of error patterns may be used by the outcome handler to flag deterministic error. The outcome handler 660 uses these patterns to do a regular expression match in the response stream.

A third one of the outcomes may include the repository 695 hanging (i.e., does not return from the execution of the command). In one embodiment, this outcome may be treated exactly like a non-deterministic error as discussed in reference to the second one of the outcomes.

In accordance with one embodiment, each replicator 600 can be alternatively configured. In one alternative embodiment, the replicator 600 may be embedded in and driven directly by the client 680 of the repository 695. In another alternative embodiment, the replicator 600 may be embedded in the client interface 690 to the repository 695. In another alternative embodiment, the replicator 600 may be embedded in the repository 695. In another alternative embodiment, the global sequencer of the replicator (e.g., the global sequencer 280 shown in the replicated state machine 200 in FIG. 3) may be based on other technologies, with corresponding compromises of robustness and quality of service. One of several possible examples of such a technology is Group Communication. In another alternative embodiment, the replicator 600 drives more than one repository 695, with corresponding compromise of robustness and quality of service. In another alternative embodiment, the modules of the replicator 600 are merged into more coarse-grained modules, split into more fine-grained modules, or both. In another alternative embodiment, as a redundant safeguard against deviation from one-copy-serializability, responses of all the distributed application systems 601 are compared to ensure that the information contained in the repositories 695 of each distributed application system 601 remains consistent with respect to each other distributed application system 601.

In reference to FIGS. 7 and 8, each one of the repositories 695 discussed above may be a Concurrent Versions System (CVS) repository and the clients 680 may correspondingly be CVS clients. Where the repositories 695 are CVS repositories and the clients 680 are CVS clients, the interfaces associated with the repositories 695 and the clients 680 are CVS specific interfaces (e.g., a replicator CVS client interface, a replicator CVS repository interface and a repository CVS client interface). Furthermore, in accordance with one embodiment, the replicator 600 can be modified to include functionality that is specifically and especially configured for use with a CVS repository.

The replicator client interface 610 disclosed herein may be configured specifically for interfacing with a CVS client of a targeted CVS repository. To this end, the replicator client interface 610 stores incoming bytes from the CVS Client into a memory mapped file buffer. The replicator client interface 610 detects the end of CVS command when it sees a valid command string in the incoming byte stream. A non-limiting, list of such valid command strings may include, but is not limited to, "Root", "Valid-responses", "valid-requests", "Repository", "Directory", "Max-dotdot", "Static-directory", "Sticky", "Entry", "Kopt", "Checkin-time", "Modified", "Is-modified", "UseUnchanged", "Unchanged", "Notify", "Questionable", "Argument", "Argumentx", "Global_option", "Gzip-stream", "wrapper-sendme-rcsOptions", "Set", "expand-modules", "ci", "co", "update", "diff", "log", "rlog", "list", "rlist", "global-list-quiet", "ls", "add", "remove", "update-patches", "gzip-file-contents", "status", "rdiff", "tag", "rtag", "import", "admin", "export", "history", "release", "watch-on", "watch-off", "watch-add", "watch-remove", "watchers", "editors", "init", "annotate", "rannotate", "noop" and "version".

The replicator client interface 610 then tries to classify the incoming CVS command as a read command or a write command. A non-limiting, list of valid write command strings may include, but is not limited to, "ci", "tag", "rtag", "admin", "import", "add", "remove", "watch-on", "watch-off" and "init". Any command within the list of valid command strings that does not belong to the list of valid write command strings is deemed herein to be a read command string with respect to the list of valid command strings.

The read commands are directly delivered to the CVS replicator repository interface for execution by the targeted CVS repository. The CVS write commands are optionally delivered to the Pre-qualifier module 20.

For each CVS write command, the Pre-qualifier module 20 may optionally determine whether the CVS command is doomed to fail, and if so, determine an appropriate error message or error status to be returned to the CVS client. The failure detection may be based on matching the result or status byte stream returned by the CVS repository with known error patterns. Examples of known system error patterns included, but are not limited to, cannot create symbolic link from .* to .*; cannot start server via rsh; cannot fstat .*; failed to create temporary file; cannot open dbm file .* for creation; cannot write to .*; can't stat history file; cannot open history file: .*; cannot open '.*'; could not stat RCS archive .* for mapping; cannot open file .* for comparing; virtual memory exhausted; cannot ftello in RCS file .*; can't read .*; unable to get list of auxiliary groups; cannot fsync file .* after copying; cannot stat .*; cannot open current directory; cannot stat directory .*; cannot write .*; cannot readlink .*; cannot close pipe; cannot change to directory .*; cannot create temporary file; could not get file information for .*; could not open diff output file .*; cannot create .*; cannot get working directory; cannot lstat .*; fork for diff failed on .*; could not get info for '.*'; cannot change mode for .*; cannot ftello for .*; Message verification failed; cannot stat temp file .*; out of memory; cannot make directory .* in .*; login: Failed to read password; error reading history file; could not get working directory; can't set close-on-exec flag on \d+; error writing to lock file .*; cannot write to history file: .*; cannot rename file .* to .*; cannot change to .* directory; cannot get file information for .*; cannot create .* for copying; cannot write temporary file .*; cannot open .*; flow control read failed; writing to server; cannot close .*; could not open lock file '.*' cannot fdopen \d+ for read; cannot close temporary file .*; not change directory to requested checkout directory '.*'; cannot make directory .*; invalid umask value in; failed to open .* for reading; unable to get number of auxiliary groups; could not open .* for writing; could not chdir to .*; fork failed while diffing .*; could not open .*; cannot fdopen \d+ for write; write to .* failed; cannot create temporary file .*; could not read .*; cannot write file .* for copying; cannot open .* for copying; cannot dup2 pipe; cannot getwd in .*; cannot open .* for writing; cannot fork; error writing to server; could not check in .* --fork failed; cannot read file .* for comparing; cannot link .* to .*; error closing .*; cannot dup net connection; read of data failed; cannot read .*; cannot remove .*; could not chdir to '.*'; unable to open temp file .*; could not stat .*; cannot open directory .*; fwrite failed; cannot create temporary file '.*'; cannot stat temp file; can't stat .*; cannot read '.*'; error diffing .*; could not create special file .*; cannot close history file: .*; could not map memory to RCS archive *; cannot make directory '.*'; cannot read file .* for copying; cannot create pipe; cannot open temporary file .*; cannot remove file .*; cannot open; cannot seek to end of history file: .*; cannot chdir to .*; read of length failed; cannot exec .*; cannot fdopen .* and cannot find size of temp file. Examples of known non-system error patterns included, but are not limited to, internal error; no such repository; could not find desired version; getsockname failed:; warning: ferror set while rewriting RCS file; internal error: islink doesn't like readlink; access denied; cannot compare device files on this system; server internal error: unhandled case in server_updated; received .* signal; internal error: no revision information for; protocol error: duplicate Mode; server internal error: no mode in server_updated; rcsbuf cache open: internal error; Fatal error, aborting; fatal error: exiting; .*: unexpected EOF; .*: confused revision number; invalid rcs file; EOF in key in RCS file; RCS files in CVS always end in, v; lost hardlink info for; cannot read .*: end of file; rcsbuf open: internal error; out of memory; cannot allocate infopath; dying gasps from .* unexpected; internal error: bad date .*; kerberos authentication failed: .*; .*, delta .*: unexpected EOF; unexpected EOF reading RCS file .*; ERROR: out of space-aborting; flow control EOF; cannot fseeko RCS file .*; checksum failure on .*; CVS internal error: unknown status \d+; internal error: bad argument to run_print; cannot copy device files on this system; unexpected end of file reading .*; out of memory; internal error: no parsed RCS file; internal error: EOF too early in RCS_copydeltas; internal error: testing support for unknown response\?; EOF in value in RCS file .*; PANIC\* administration files missing\!; premature end of file reading .*; EOF while looking for value in RCS file .*; cannot continue; read lock failed-giving up; unexpected EOF reading .*; cannot resurrect '.*'; RCS file removed by second party; your apparent username .* is unknown to this system; file attribute database corruption: tab missing in .*; can't import .*: unable to import device files on this system; can't import .*: unknown kind of special file; cannot import .*: special file of unknown type; ERROR: cannot mkdir .* --not added; cannot create write lock in repository '.*; cannot create .*: unable to create special files on this system; can't preserve .*: unable to save device files on this system; error parsing repository file .* file may be corrupt and unknown file status \d+ for file .*.

As discussed above in reference to FIGS. 7 and 8, for each command, the pre-qualifier module 620 may determine that the command is doomed to fail and can bypass both the replicated state machine 630 and the scheduler 640. In the case of CVS specific functionality, if the pre-qualifier module 620 did not determine that the replicated state machine 630 could be bypassed, the command may be converted into a CVS proposal command. The CVS proposal command contains the actual CVS command byte array as well as a lock set describing the write locks this CVS command would cause the CVS repository to obtain if it was executed by it directly. As is discussed below, the scheduler 640 utilizes this lock set.

The CVS proposal command may be delivered to the replicated state machine 630. The replicated state machine 630 collates all the commands submitted to it and its peer replicated state machines 630 at each of the other replicators, into a sequence. This sequence is assured to be identical at all the replicas. At each of the distributed application systems 601, the replicated state machine 630 delivers the commands collated as above, in sequence, to the scheduler 640.

The scheduler 640 performs a dependency analysis on the commands delivered to it, and determines the weakest partial ordering of commands that would still ensure one-copy serializability. The scheduler 640 delivers the commands to the CVS replicator repository interface, concurrently when permitted by the constructed partial order, sequentially otherwise.

In accordance with one embodiment, the dependency analysis may be based on testing for lock conflicts. Each CVS proposal command submitted to the scheduler contains a lock set. The scheduler ensures a command is delivered to the CVS repository interface if and only if no other command's lock set conflicts with its lock set. If a conflict is detected the command waits in queue to be scheduled at a latter point when all the locks in the lock set can be obtained without conflicts.

Memberships

In a distributed system of processes hosting replicated state machines, it is desirable to have the ability to change the association of the state machine to the collection of processes, or membership, that participate in the operation of the state machine. For example, an example of membership change may be in an implementation of the Paxos algorithm (Lamport, L.: The Part-Time Parliament, ACM Transactions on Computer Systems 16, 2 (May 1998), 133-169) where the sets of proposers (processes who make proposals to the membership), acceptors (processes who vote on whether a proposal should be agreed by the membership) and learners (processes in the membership who learn of agreements that have been made) may be rotated or changed in order to handle situations where processes are removed from the system as they are taken off-line permanently and decommissioned, or as new are processes added to the system to achieve greater fault-tolerance or through-put.

Figure 9:
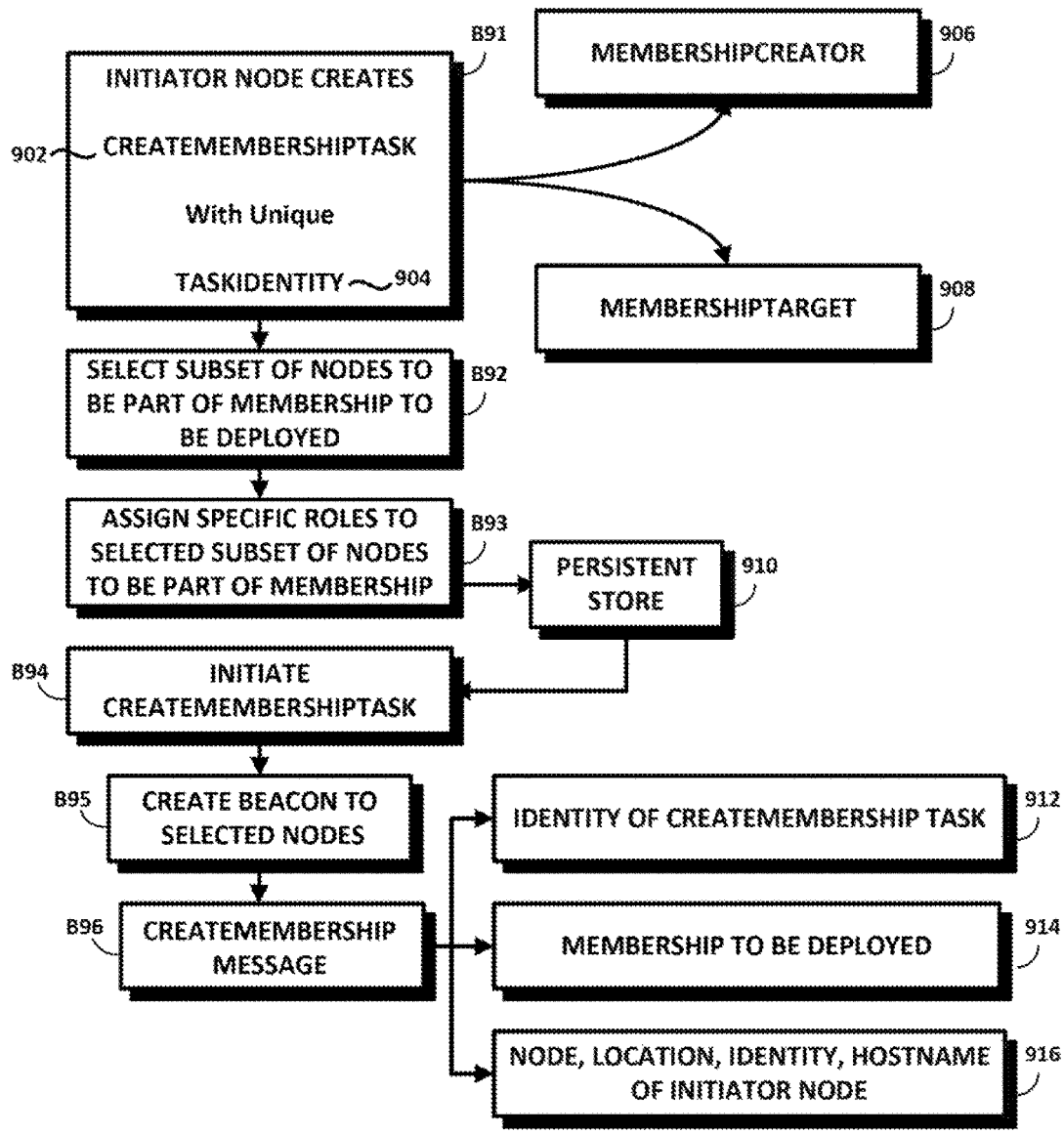
FIG. 9 shows aspects of a method of deploying a membership of nodes in a distributed computing system, according to one embodiment.

FIG. 9 shows aspect of a method of deploying a membership of nodes in a distributed computing system, according to one embodiment. As shown therein and according to one embodiment, a task, CreateMembershipTask, may be initiated by an initiating node that has been inducted into an existing network of nodes (i.e., one or more distributed compute nodes) and this task may be used to create a membership from the set of computing nodes of which the initiating node is aware. According to one embodiment, this may be achieved using the following procedure:

Roles:

According to one embodiment, the CreateMembershipTask 902 may be configured to have two roles: the MembershipCreator role 906, or the role assumed by a node that initiates the creation of a new membership, and the Membership Target role 906, or the role assumed by a node that is to be part of a new membership, as specified by the MembershipCreator. Note that there may be one or more nodes in the Membership Target defined in the CreateMembershipTask 902 and that the MembershipCreator 906 may or may not be among the nodes listed in the nodes in MembershipTarget 908, thus allowing for 'remote' memberships to be created, or pushed to a set of other nodes.

Protocol:

According to one embodiment, and as shown in FIG. 9,

As shown at B91, the node assuming the MembershipCreator role 906 may be configured to create a CreateMembershipTask 902 with a unique identifier TaskIdentity 904.

The node assuming the MembershipCreator role may be configured to select all or a subset of nodes from the complete set of nodes of which it is aware to form the membership as shown at B92 and may be configured to add the selected node(s) to CreateMembershipTask 902. As described above, this subset may or may not include the MembershipCreator node itself, thus allowing a 'remote' membership to be formed that does not include the node assuming the MembershipCreator role 906.

The node assuming the MembershipCreator 906 role may be further configured to create a new Membership from the set of nodes, to assign specific roles thereto, as shown at B93 and to associate/add the membership to the CreateMembershipTask 902.

The CreateMembershipTask 902 initiate may be persisted in a persistent store 903 and initiated, as shown at B94.

The initiation of the task CreateMembershipTask causes the initiating node to create a beacon (a beacon is process configured to repeatedly broadcast a message to a predetermined list of target recipients, removing target recipients from the predetermined list to which the message is broadcast until a reply acknowledgment has been received from each of the target recipients), as shown at B95, using the list of locations (addresses) it has been given. The thus-created beacon may be configured to send, at B96, a CreateMembership message to those addresses. According to one embodiment, this CreateMembership message may be configured to comprise:

the identity of the CreateMembershipTask 912;

The new membership to be deployed 914; and the node, location, identity, the hostname and/or port of the node having initiated the MembershipCreator task, as shown at 916.

Figure 10:
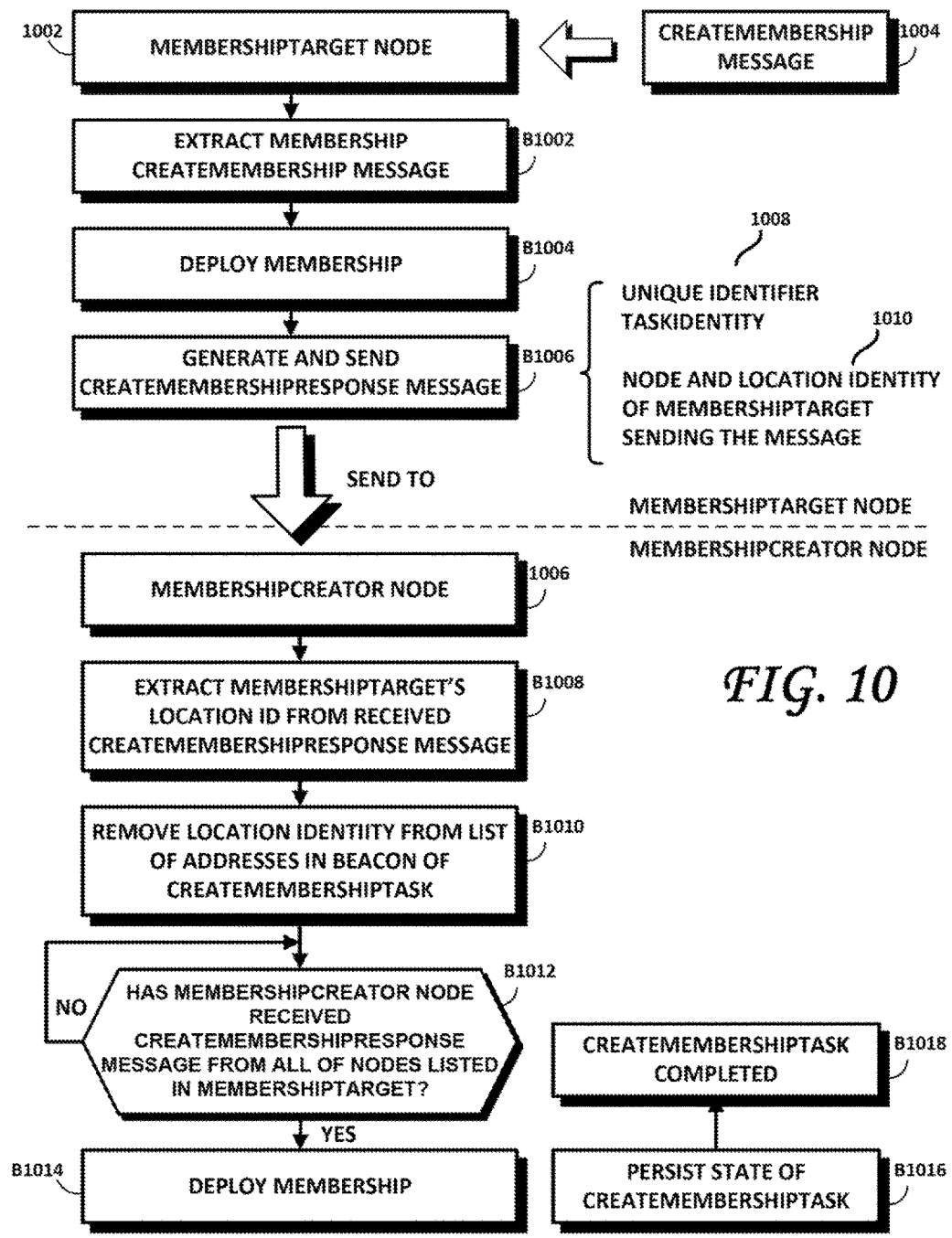
FIG. 10 shows further aspects of a method of deploying a membership of nodes in a distributed computing system, according to one embodiment.

FIG. 10 shows further aspect of a method of deploying a membership of nodes in a distributed computing system, according to one embodiment. A shown and according to one embodiment, when the MembershipTarget node 1002 receives the CreateMembership message 1004 from the initiating node (the MembershipCreator node), the Membership Target 1002 node may be configured to:

extract the membership from the message, as shown at B1002;

deploy the membership at B1004;

generate and send a CreateMembershipResponse message, as shown at B1006 to the MembershipCreator node 1006 to indicate that it has deployed the new Membership. According to one embodiment, the CreateMembershipResponse message may be configured to comprise:

the identity of the CreateMembershipTask (e.g., the unique identifier TaskIdentity 1008; and the node and location identity of the Membership Target sending the message, as shown at 1010.

According to one embodiment, when the MembershipCreator node 1006 receives a CreateMembershipResponse message, the MembershipCreator node may:

extract the Membership Target's (the sending node) location identity from the message, as shown at B1008;

remove the location identity from the list of addresses in the beacon of the CreateMembershipTask, as called for at B1010;

check whether there are any locations specified in the MembershipTarget of which the MembershipCreator node has not heard from yet (i.e., whether the number of Membership Targets still to reply with a CreateMembershipResponse message is greater than zero), as shown at B1012;

If there are more locations that have yet to respond to the CreateMembership message (there are greater than zero locations remaining in the beacon) the MembershipCreator node may wait for additional messages (e.g., CreateMembershipResponse messages from nodes listed in the MembershipTarget) to be received (NO branch of B1012). If, however, there are no more locations that have yet to respond (there are zero locations left in the beacon), the Yes branch of B1012 is followed and the MembershipCreator node may be configured to deploy the membership itself/locally as shown at B1014 and persist the state of the CreateMembershipTask, as shown at B1016. The CreateMembershipTask task can then be marked as completed, as shown at B1018.

Safety and Liveness Properties

Any membership protocol, according to one embodiment, may comprise both safety and liveness properties. Indeed, a membership protocol according to one embodiment may be provided with a set of safety properties to ensure that nothing "bad" happens during the deployment of a new membership, as well as with a set of liveness properties, to provide for the occurrence of something "good" eventually happening (e.g., the new membership will be deployed).

Safety Properties

According to one embodiment, membership deployment is idempotent, in that it will produce the same result if executed once or multiple times. Therefore, if the MembershipCreator fails before it has received responses from all the nodes listed in the Membership Target, that node can restart the CreateMembershipTask from the beginning and resend duplicate CreateMembership messages each of the target nodes without changing the eventual outcome. Upon receipt of the CreateMembership message, the target nodes may respond with a CreateMembershipResponse indicating the new Membership has been deployed. There is no need for the CreateMembershipTask to be persisted each time a CreateMembershipResponse message is received: the only time the CreateMembershipTask needs to be persisted (other than when it is first created) is when all responses have been received and the task can be/is marked as having been completed.

Liveness Properties

The use of a beacon, according to one embodiment, ensures that at least one CreateMembership message will eventually reach each targeted node in the MembershipTarget. If the response to this message is lost (i.e., the CreateMembershipResponse message) is also lost, the MembershipCreator may keep sending the CreateMembership message (it being idempotent) until it receives the anticipated CreateMembershipResponse from the target nodes. As the safety properties dictate that the receipt of multiple CreateMembership messages is idempotent, this combination will ensure the process eventually completes.

Figure 11:
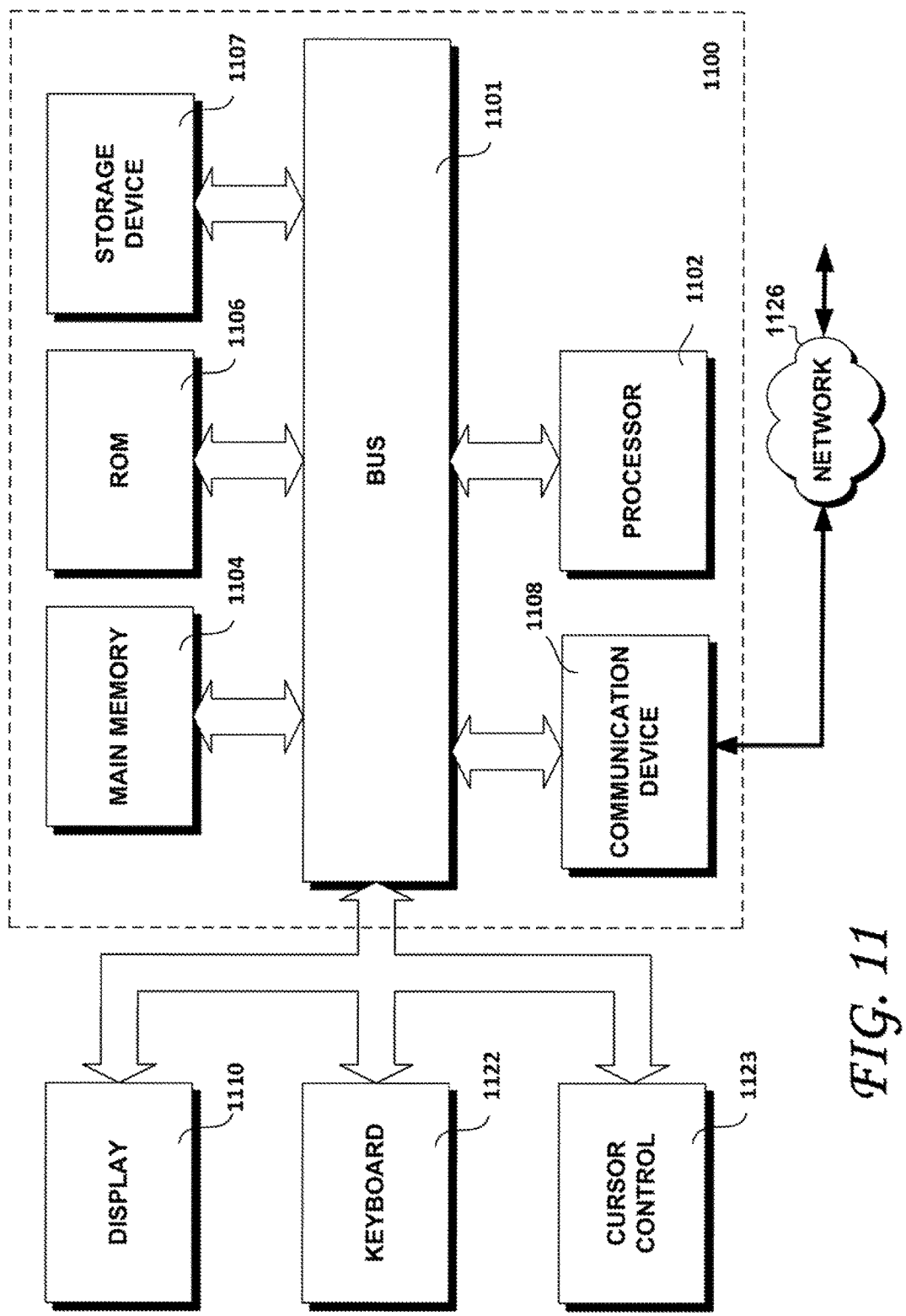
FIG. 11 is a block diagram of a computing device with which embodiments may be implemented.

FIG. 11 illustrates a block diagram of a computer system 1100 upon which embodiments may be implemented. Computer system 1100 may include a bus 1101 or other communication mechanism for communicating information, and one or more processors 1102 coupled with bus 1101 for processing information. Computer system 1100 further comprises a random access memory (RAM) or other dynamic storage device 1104 (referred to as main memory), coupled to bus 1101 for storing information and instructions to be executed by processor(s) 1102. Main memory 1104 also may be used for storing temporary variables or other intermediate information during execution of instructions by processor 1102. Computer system 1100 also may include a read only memory (ROM) and/or other static storage device 1106 coupled to bus 1101 for storing static information and instructions for processor 1102. A data storage device 1107 such as, for example, a magnetic disk or Flash storage, may be coupled to bus 1101 for storing information and instructions. The computer system 1100 may also be coupled via the bus 1101 to a display device 1110 for displaying information to a computer user. An alphanumeric input device 1122, including alphanumeric and other keys, may be coupled to bus 1101 for communicating information and command selections to processor(s) 1102. Another type of user input device is cursor control 1123, such as a mouse, a trackball, or cursor direction keys for communicating direction information and command selections to processor 1102 and for controlling cursor movement on display 1121. The computer system 1100 may be coupled, via a communication device (e.g., modem, NIC) to a network 1126 and to one or more nodes of a distributed computing system.

Embodiments are related to the use of computer system and/or to a plurality of such computer systems to create and deploy memberships in a distributed computing system. According to one embodiment, the methods and systems described herein may be provided by one or more computer systems 1100 in response to processor(s) 1102 executing sequences of instructions contained in memory 1104. Such instructions may be read into memory 1104 from another computer-readable medium, such as data storage device 1107. Execution of the sequences of instructions contained in memory 1104 causes processor(s) 1102 to perform the steps and have the functionality described herein. In alternative embodiments, hard-wired circuitry may be used in place of or in combination with software instructions to implement the present invention. Thus, the present invention is not limited to any specific combination of hardware circuitry and software. Indeed, it should be understood by those skilled in the art that any suitable computer system may implement the functionality described herein. The computer system may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structures (such as, for example,) may differ from those shown in the figures. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method of deploying a membership of distributed compute nodes in a distributed computing system, comprising;
   selecting distributed compute nodes to be part of membership of distributed compute nodes to be deployed;
   creating a membership task identifying a membership creator distributed compute node as the distributed compute node that is creating the membership to be deployed, the membership task further comprising a membership target identifying at least one distributed compute node of the distributed computing system that is to become a member of the membership, the membership target not including the membership creator distributed compute node;
   repeatedly sending, over a computer network, a create membership message to each distributed compute node identified in the membership target, the create membership message comprising at least an identity of the membership task and an identification of the membership to be deployed;
   upon receiving a response from a distributed compute node in the membership target, deploying the membership when a response has been received from each of the distributed compute nodes identified in the membership target, and
   after a response has been received from each of the distributed compute nodes identified in the membership target and the membership has been deployed, storing the deployed membership task in a persistent memory;
   restarting, by the membership creator distributed compute node, the membership task and repeatedly resending duplicate create membership messages to at least one of the distributed compute nodes identified in the membership target if the membership creator distributed compute node fails before it has received responses from each of the distributed compute nodes identified in the membership target.

2. The computer-implemented method of claim 1, further comprising assigning at least one role to the distributed compute nodes selected to be part of the membership to be deployed.

3. The computer-implemented method of claim 2, wherein the at least one role comprises a role of a membership creator and a role of a membership target.

4. The computer-implemented method of claim 1, wherein the create membership message further comprises an identification of the membership creator distributed compute node and sufficient information to enable communication therewith.

5. The computer-implemented method of claim 4, wherein the information sufficient to communicate with the membership creator distributed compute node comprises at least one of an identification, a location, a hostname and port of the membership creator distributed compute node.

6. The computer-implemented method of claim 1, wherein the membership task is identified by a unique task identifier.

7. The computer-implemented method of claim 1, wherein deployment of the membership is idempotent.

8. The computer-implemented method of claim 1, wherein the response comprises the identification of the membership to be deployed and a distributed compute node and location identity of the distributed compute node in the membership target sending the response.

9. The computer-implemented method of claim 1, further comprising:
   extracting the identification of the membership to be deployed from the response;
   removing the responding distributed compute node from the distributed compute nodes identified in the membership target to which the create membership message is repeatedly sent; and
   checking whether a response has been received from each of the distributed compute nodes identified in the membership target.

10. A computing device, comprising:
    a memory;
    a processor, and
    a plurality of processes spawned by the processor, the processes being configured to cause the computing device to deploy a membership of distributed compute nodes in a distributed computing system, the plurality of processes comprising processing logic to:
    select distributed compute nodes to be part of membership of distributed compute nodes to be deployed;
    create a membership task identifying a membership creator distributed compute node as the distributed compute node that is creating the membership to be deployed, the membership task further comprising a membership target identifying at least one distributed compute node of the distributed computing system that is to become a member of the membership, the membership target not including the membership creator distributed compute node;
    repeatedly send, over a computer network, a create membership message to each distributed compute node identified in the membership target, the create membership message comprising at least an identity of the membership task and an identification of the membership to be deployed;
    upon receiving a response from a distributed compute node in the membership target, deploy the membership when a response has been received from each of the distributed compute nodes identified in the membership target, and
    after a response has been received from each of the distributed compute nodes identified in the membership target and the membership has been deployed, store the deployed membership task in a persistent memory;
    restart, by the membership creator distributed compute node, the membership task and repeatedly resend duplicate create membership messages to at least one of the distributed compute nodes identified in the membership target if the membership creator distributed compute node fails before it has received responses from each of the distributed compute nodes identified in the membership target.

11. The computing device of claim 10, further comprising processing logic to assign at least one role to the distributed compute nodes selected to be part of the membership to be deployed.

12. The computing device of claim 11, wherein the at least one role comprises a role of a membership creator and a role of a membership target.

13. The computing device of claim 10, wherein the create membership message further comprises an identification of the membership creator distributed compute node and sufficient information to enable communication therewith.

14. The computing device of claim 13, wherein the information sufficient to communicate with the membership creator distributed compute node comprises at least one of an identification, a location, a hostname and port of the membership creator distributed compute node.

15. The computing device of claim 10, wherein the membership task is identified by a unique task identifier.

16. The computing device of claim 10, wherein deployment of the membership is idempotent.

17. The computing device of claim 10, wherein the response comprises the identification of the membership to be deployed and a distributed compute node and location identity of the distributed compute node in the membership target sending the response.

18. The computing device of claim 10, further comprising processing logic to:
   extract the identification of the membership to be deployed from the response;
   remove the responding distributed compute node from the distributed compute nodes identified in the membership target to which the create membership message is repeatedly sent; and
   check whether a response has been received from each of the distributed compute nodes identified in the membership target.

19. A non-transitory machine-readable medium having data stored thereon representing sequences of instructions which, when executed by a computing device, cause the computing device to deploy a membership of distributed compute nodes in a distributed computing system by:
   selecting distributed compute nodes to be part of membership of nodes to be deployed;
   creating a membership task identifying a membership creator distributed compute node as the distributed compute node that is creating the membership to be deployed, the membership task further comprising a membership target identifying at least one distributed compute node of the distributed computing system that is to become a member of the membership, the membership target not including the membership creator distributed compute node;
   repeatedly sending, over a computer network, a create membership message to each distributed compute node identified in the membership target, the create membership message comprising at least an identity of the membership task and an identification of the membership to be deployed;
   upon receiving a response from a distributed compute node in the membership target, deploying the membership when a response has been received from each of the distributed compute nodes identified in the membership target, and after a response has been received from each of the distributed compute nodes identified in the membership target and the membership has been deployed, storing the deployed membership task in a persistent memory;
   restarting, by the membership creator distributed compute node, the membership task and repeatedly resending duplicate create membership messages to at least one of the distributed compute nodes identified in the membership target if the membership creator distributed compute node fails before it has received responses from each of the distributed compute nodes identified in the membership target.

* * * * *